US006943794B2

(12) United States Patent
Kamimura et al.

(10) Patent No.: US 6,943,794 B2
(45) Date of Patent: Sep. 13, 2005

(54) COMMUNICATION SYSTEM AND COMMUNICATION METHOD USING ANIMATION AND SERVER AS WELL AS TERMINAL DEVICE USED THEREFOR

(75) Inventors: Tokio Kamimura, Kyoto (JP); Yuzuru Tanaka, Ibaraki (JP)

(73) Assignee: Minolta Co., Ltd., Osaka (JP)

( * ) Notice: Subject to any disclaimer, the term of this patent is extended or adjusted under 35 U.S.C. 154(b) by 788 days.

(21) Appl. No.: 09/878,207

(22) Filed: Jun. 12, 2001

(65) Prior Publication Data

US 2001/0051535 A1 Dec. 13, 2001

(30) Foreign Application Priority Data

Jun. 13, 2000 (JP) ........................................ 2000-176677
Jun. 13, 2000 (JP) ........................................ 2000-176678

(51) Int. Cl.[7] ............................................. G06T 15/00
(52) U.S. Cl. ...................................... 345/473; 455/566
(58) Field of Search ................................ 345/473, 474, 345/475; 455/563, 566; 704/260, 270.1, 276

(56) References Cited

U.S. PATENT DOCUMENTS

| 5,657,426 | A | * | 8/1997 | Waters et al. ................ 704/276 |
| 5,884,267 | A | * | 3/1999 | Goldenthal et al. ....... 704/270.1 |
| 6,320,583 | B1 | * | 11/2001 | Shaw et al. .................. 345/619 |
| 6,369,821 | B2 | * | 4/2002 | Merrill et al. ............... 345/473 |
| 6,539,354 | B1 | * | 3/2003 | Sutton et al. ................ 704/260 |

FOREIGN PATENT DOCUMENTS

| EP | 0 860 811 | 8/1998 |
| JP | 01-211799 | 8/1989 |
| JP | 8-297751 | 11/1996 |
| JP | 10-200882 | 7/1998 |
| JP | 10-293860 | 11/1998 |
| JP | 11-212934 | 8/1999 |
| JP | 11-328440 | 11/1999 |

OTHER PUBLICATIONS

"NTT Gijyutu Journal (NTT Technical Journal)", Dec. 1998, PP. 98–110.

* cited by examiner

*Primary Examiner*—Phu K. Nguyen
(74) *Attorney, Agent, or Firm*—McDermott Will & Emery LLP

(57) ABSTRACT

A communication system for performing a remote conversation with an actual or fictional human or the like virtualized by using a computer comprises a client and a server, wherein the client includes an input portion for inputting a first message addressed from a user to the human or the like, a transmitting portion for transmitting the first message, a receiving portion for receiving facial animation of the human or the like and a second message that is a message sent from the human or the like to the user as a response to the first message, an output portion for outputting the second message to the user, and a display portion for displaying the facial animation; and the server includes a storing portion for storing facial image data of the human or the like, a receiving portion for receiving the first message, a first generating portion for generating the second message, a second generating portion for generating motion control data for causing the facial image data to move in accordance with the second message, a third generating portion for generating the facial animation based on the motion control data and the facial image data, and a transmitting portion for transmitting the second message and the facial animation.

26 Claims, 24 Drawing Sheets

Fig. 5
| PERSON NUMBER (NUM) | PERSON NAME (NAM) | SAMPLE IMAGE (SMP) | ... |
|---|---|---|---|
| 0001 | ○○ ○○ | 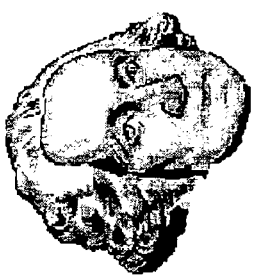 | |
| 0002 | △△ △△ | 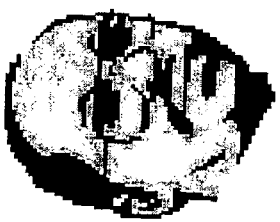 | |
| ... | | | |
(HMN1), (HMN2)
LSI Fig. 14
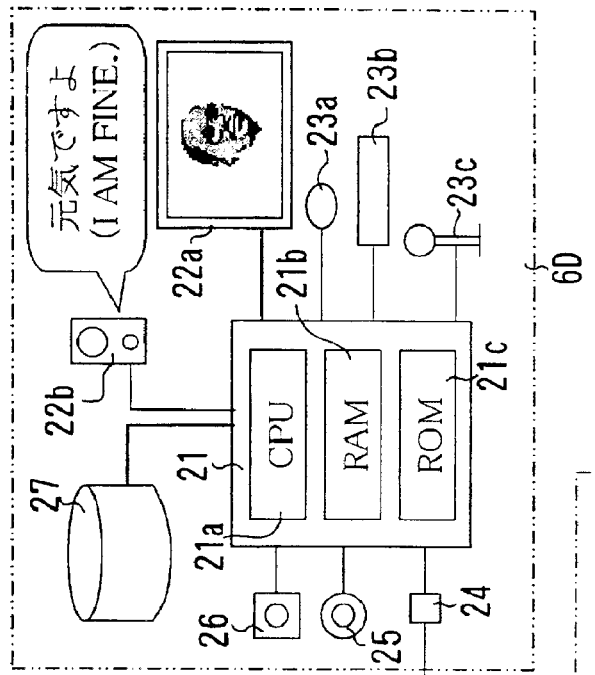
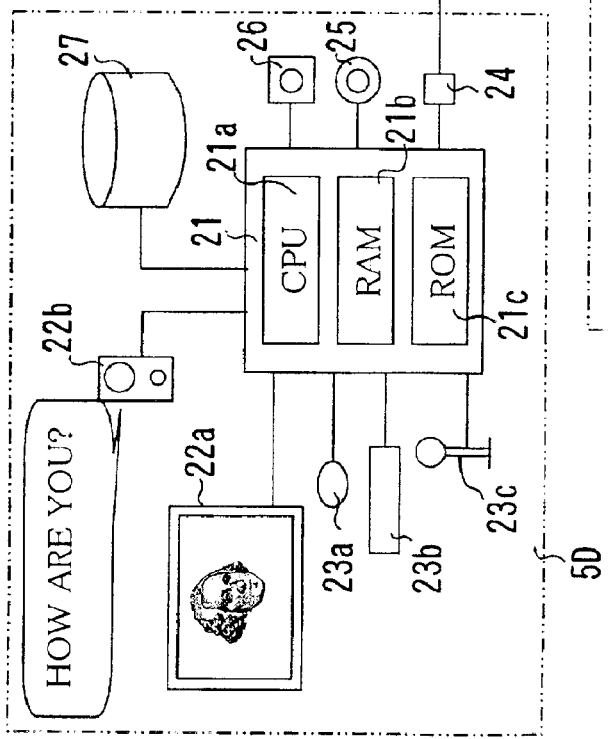
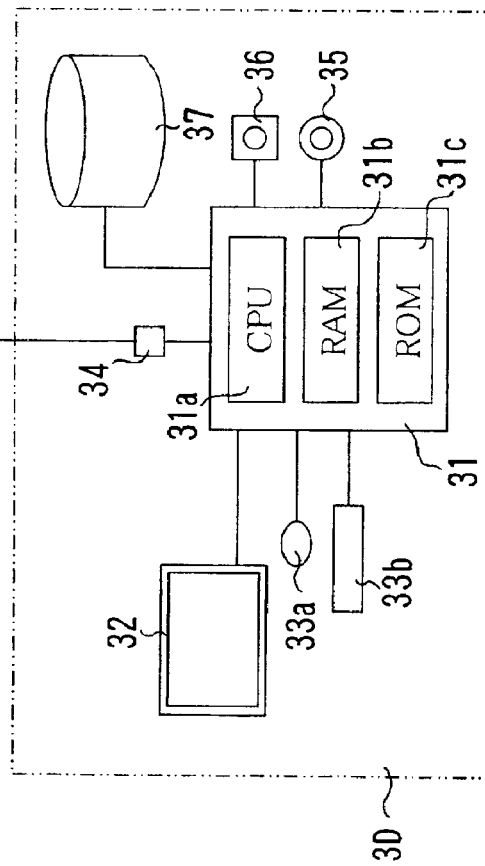

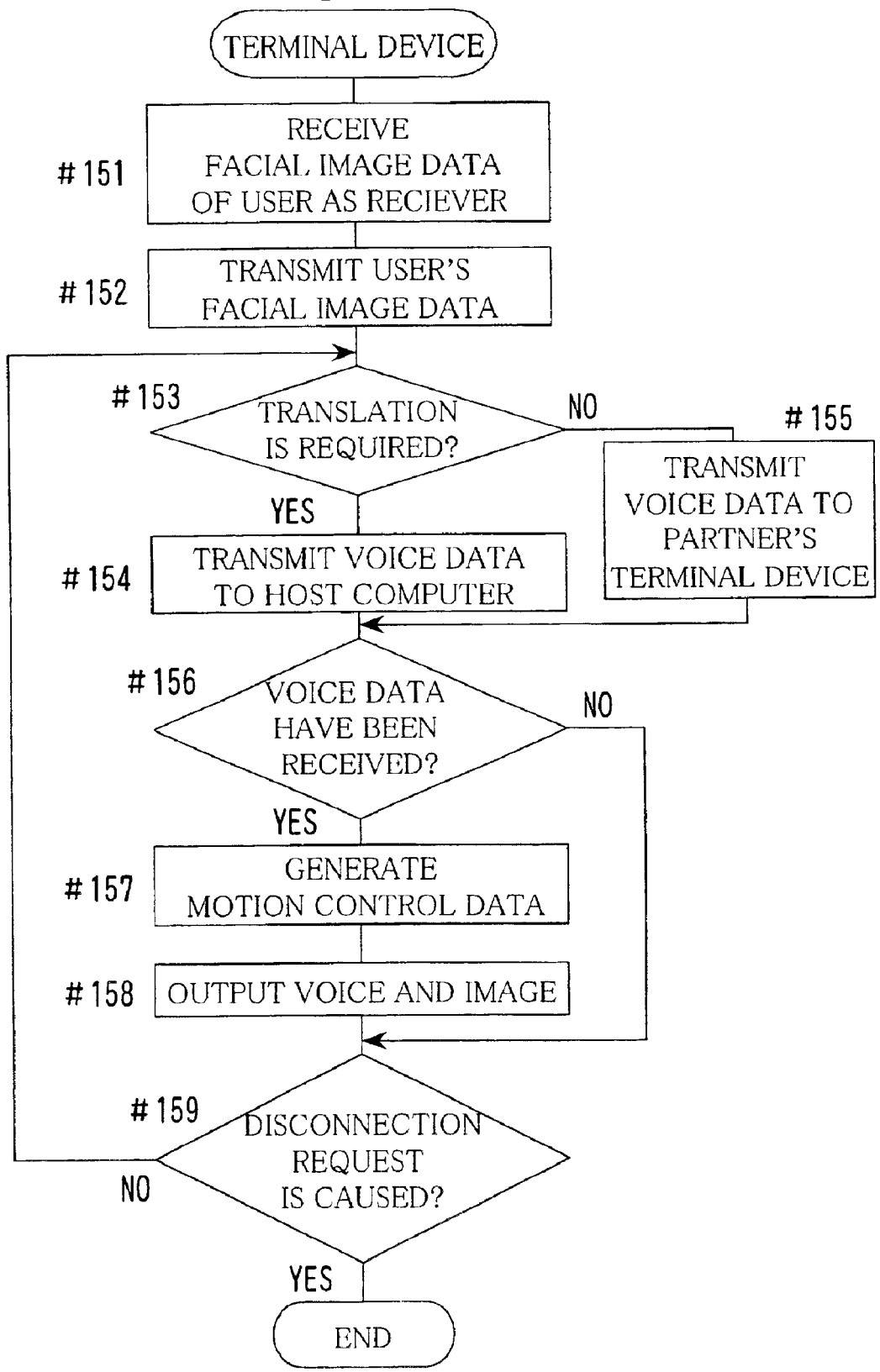

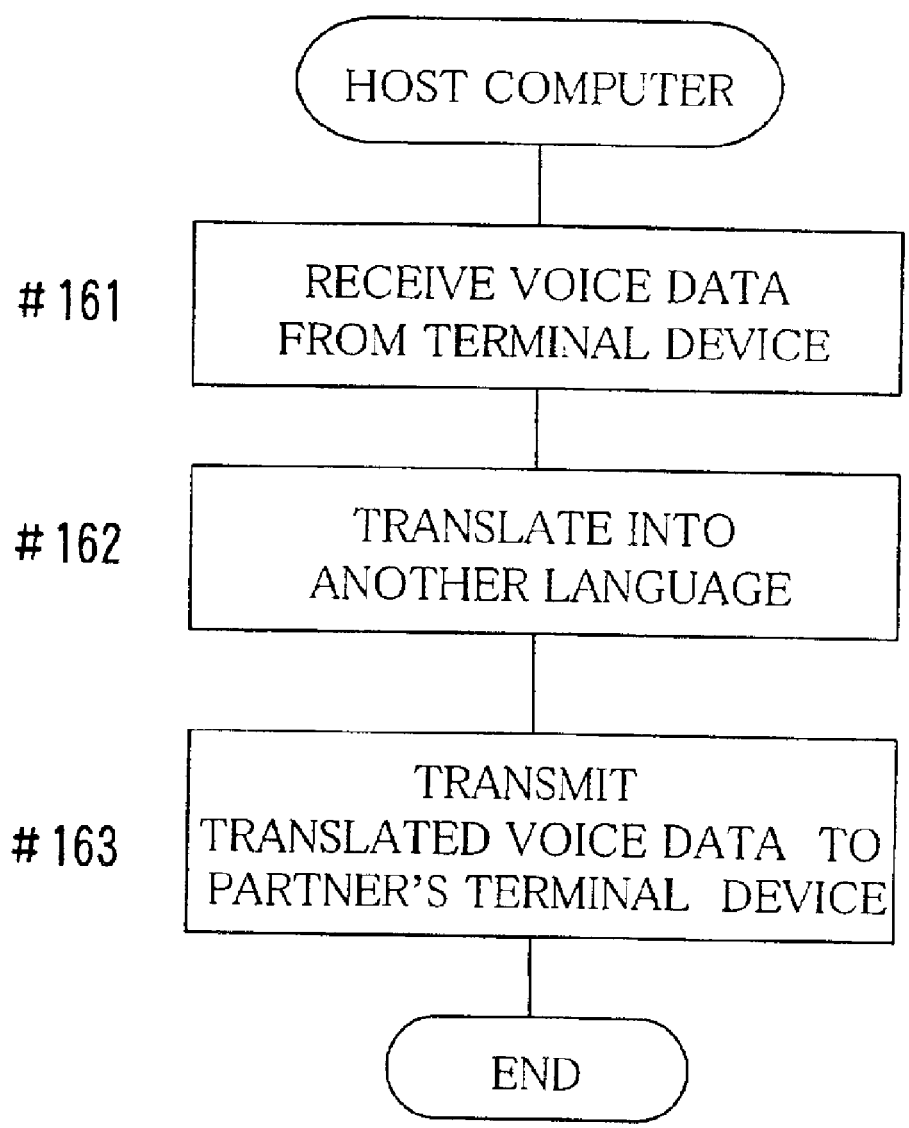

COMMUNICATION SYSTEM AND COMMUNICATION METHOD USING ANIMATION AND SERVER AS WELL AS TERMINAL DEVICE USED THEREFOR

This application is based on Japanese Patent Application Nos. 2000-176677 and 2000-176678 filed on Jun. 13, 2000, the contents of which are hereby incorporated by reference.

BACKGROUND OF THE INVENTION

1. Field of the Invention

The present invention relates to a communication system using animation and a server as well as a terminal device used for the communication system. According to the present invention, a user accesses to a server from a client via a network so that the user can remotely perform a conversation while watching animation of an actual or fictional human or the like virtualized by using a computer. In addition, the user can converse while watching animation of a person to whom the user talks.

2. Description of the Prior Art

In recent years, a technique for communicating with an actual or fictional human, animal, doll or character that are virtualized by using a computer has been researched and developed.

For example, Japanese unexamined Patent Publication No. 11-212934 discloses a technique for having a creature that is raised in a virtual space perform a predetermined action by inputting a command via an input device such as a mouse or a keyboard. According to the technique, a user takes care of a virtual pet using a computer. Specifically, the user feeds the pet, lays the pet down, praises the pet, reproves the pet or plays with the pet in a similar way to taking care of a real pet by using a computer. The pet is raised by the user as described above and the user can experience how to raise pet with confirming growth of the virtual pet via images and voices output from a display or a speaker. It is also possible to remotely raise the pet via a network.

As a method for matching an output timing of voices of life with an output timing of images thereof, there is proposed a method disclosed in European Patent No. 0860811 in which the voices are synchronized with the images for output and a method disclosed in Japanese Unexamined Patent Publication No. 10-293860 in which the images are synchronized with the voices for output. Above method enables production of animation and output of the voices at the same time with the animation; therefore, the user can realistically recognize the output images and voices. As a method for producing animation based on actual film images, there is proposed an animation synthesis technique by way of recognition of actual film images (P.98–106, December 1998, NTT Technical Journal). According to the technique, a portrait is automatically made by a picture and expressions of different opening states of eyes and a mouth and expressions of various emotions are automatically made based on the portrait. Then, the portrait is synchronized with a voice so that portrait animation can be synthesized.

In the above-described technique disclosed in Japanese Unexamined Patent Publication No. 11-212934, the user can remotely communicate with the virtual pet via the network. In the conventional technique, however, the virtual pet is controlled by commands from the user that are input via the input device so as to be displayed on the display; therefore, the user can communicate with the virtual pet only in limited patterns. For example, the technique does not allow conversation between the user and the virtual pet; therefore, realistic communication cannot be achieved by the technique.

The technique for producing the animation disclosed in European Patent No. 0860811 enables production of the animation including a motion of a person who is talking, for example. However, the user and the person cannot talk to each other, since the voices and the images are output uni-directionally from the person to the user.

A communication system such as a television telephone or a television conference system is actually utilized, in which a conversation can be performed with watching a partner's face by transmitting and receiving voices and images among a plurality of terminal devices.

However, since the images have a large amount of data, a communication line having large capacity for communication is required in order to transmit and receive the images. In the case of transmission and reception of images via a general telephone line, it is impossible to send and receive more than a few frames as an image per second and, therefore, it is impossible to display a satisfactorily animated image. In turn, the usage of a high-speed private line enables display of animated images wherein a motion appears substantially natural, however, it has not been widely prevalent yet due to high communication cost.

In order to reduce communications traffic, there has been proposed a method in which images of a part of and whole parts of a face are previously produced at low resolution for registration in a database, and then the whole facial image is displayed on a screen of a receiver's terminal device at the start of a conversation and only a part of the facial image corresponding to a part in which expressions have changed is downloaded from the database to the terminal device so as to be displayed in Japanese Unexamined Patent Publication No. 10-200882.

Reduction in the communications traffic can be realized by using the above-described conventional method. However, it is difficult to express a natural motion such as person's expressions since the resolution of the images is low and a plurality of two-dimensional images is continuously combined so as to be displayed.

Additionally, since respective users performing a conversation by means of the communication system must understand a common language, it is impossible for users using different languages to utilize the communication system described above.

SUMMARY OF THE INVENTION

An object of the present invention is to provide a communication system, a server and a client for achieving a remote conversation with an actual or fictional human or the like virtualized by using a computer.

Another object of the present invention is to reduce communications traffic and to perform a conversation with watching animation in which a motion of a partner (user at the other end) is smooth and substantially natural.

Further object of the present invention is to realize a conversation with watching animation in which a partner's motion is smooth and substantially natural even in a conversation between users using different languages.

According to one aspect of the present invention, a communication system for performing a conversation with an actual or fictional human, animal, doll or character virtualized by using a computer comprises a client and a server, wherein the client includes an input portion for inputting a first message addressed from a user to the human, the animal, the doll or the character, a transmitting portion for transmitting the first message, a receiving portion for receiving a second message which is a message addressed from the human, the animal, the doll or the character to the user as a response to the first message and facial animation of the human, the animal, the doll or the character, an output portion for outputting the second message to the user and a display portion for displaying the facial animation; and the server includes a storing portion for storing facial image data of the human, the animal, the doll or the character, a receiving portion for receiving the first message, a first generating portion for generating the second message in response to the reception of the first message, a second generating portion for generating motion control data for moving the facial image data in accordance with the second message, a third generating portion for generating the facial animation based on the motion control data and the facial image data and a transmitting portion for transmitting the second message and the facial animation.

According to another aspect of the present invention, a communication system for performing a conversation with watching a partner's animation (animation of a partner) comprises a host computer and a plurality of terminal devices, wherein each of the terminal devices includes a transmission and reception portion for transmitting and receiving a voice, a first receiving portion for receiving image data, a second receiving portion for receiving motion control data for moving the image data and a display portion for displaying animation generated by moving the image data based on the motion control data, and the host computer includes a receiving portion for receiving a voice, a translation portion for translating the received voice into another natural language, a first transmitting portion for transmitting the translated voice, a generating portion for generating the motion control data based on the translated voice and a second transmitting portion for transmitting the image data and the motion control data of one of the terminal devices in communication to another one of the terminal device in the communication.

Further objects and advantages of the invention can be more fully understood from the following drawings and detailed description.

BRIEF DESCRIPTION OF THE DRAWINGS

FIG. 5 shows an example of a person list.

FIG. 14 is a block diagram showing a whole structure of a communication system according to a fourth embodiment of the present invention.

FIG. 23 is a flowchart showing a process of a terminal device.

FIG. 24 is a flowchart showing a process of a host computer.

DESCRIPTION OF THE PREFERRED EMBODIMENTS

First, as a communication system, three embodiments will be described. In communication systems 1, 1B and 1C of the three embodiments, various persons may be virtualized by using a computer and may be displayed as animation. A user can select a person according to the user's preference from the persons and perform a conversation with the selected person.

First Embodiment

Figure 1:
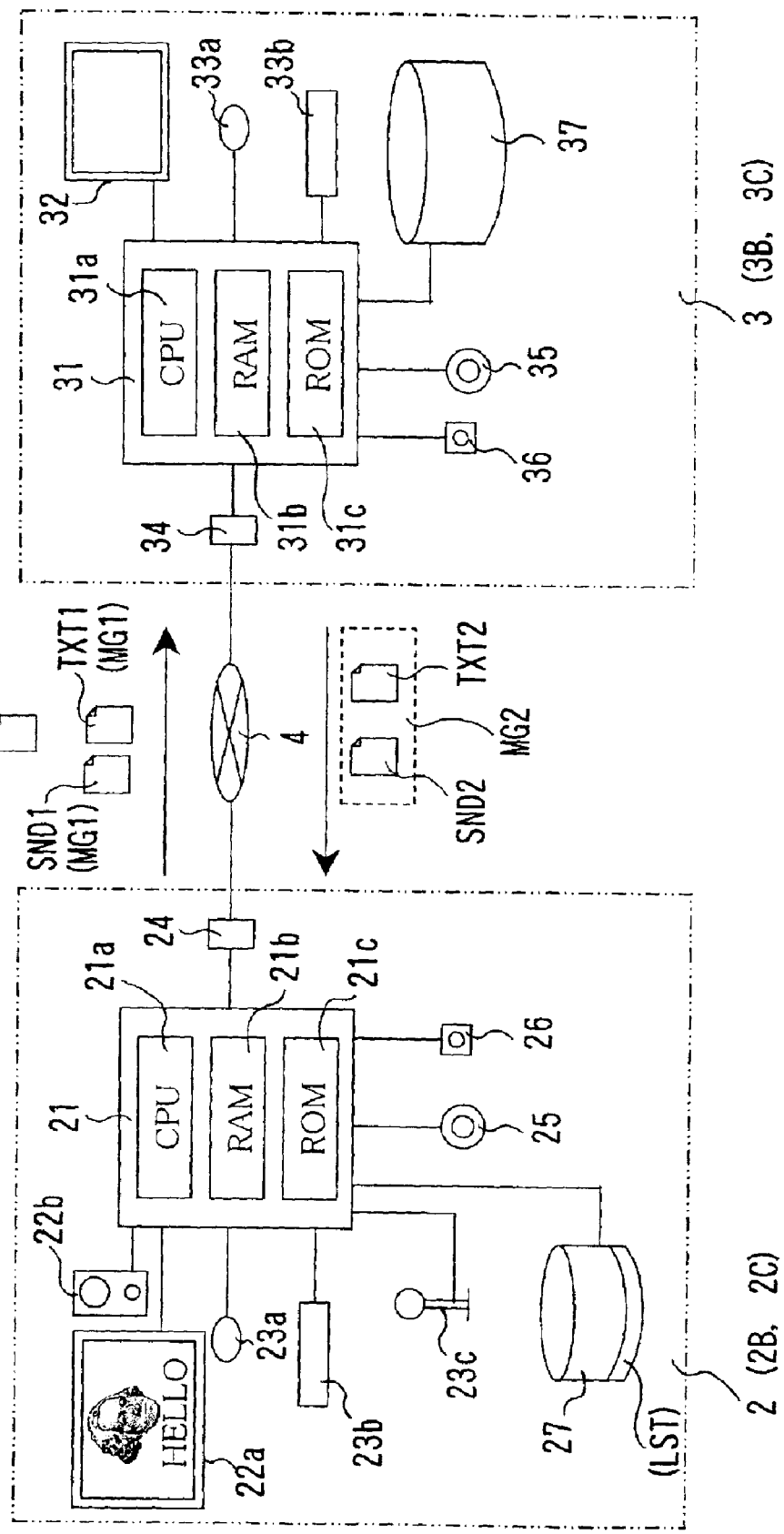
FIG. 1 is a block diagram showing a whole structure of a communication system according to the present invention.
Figure 2:
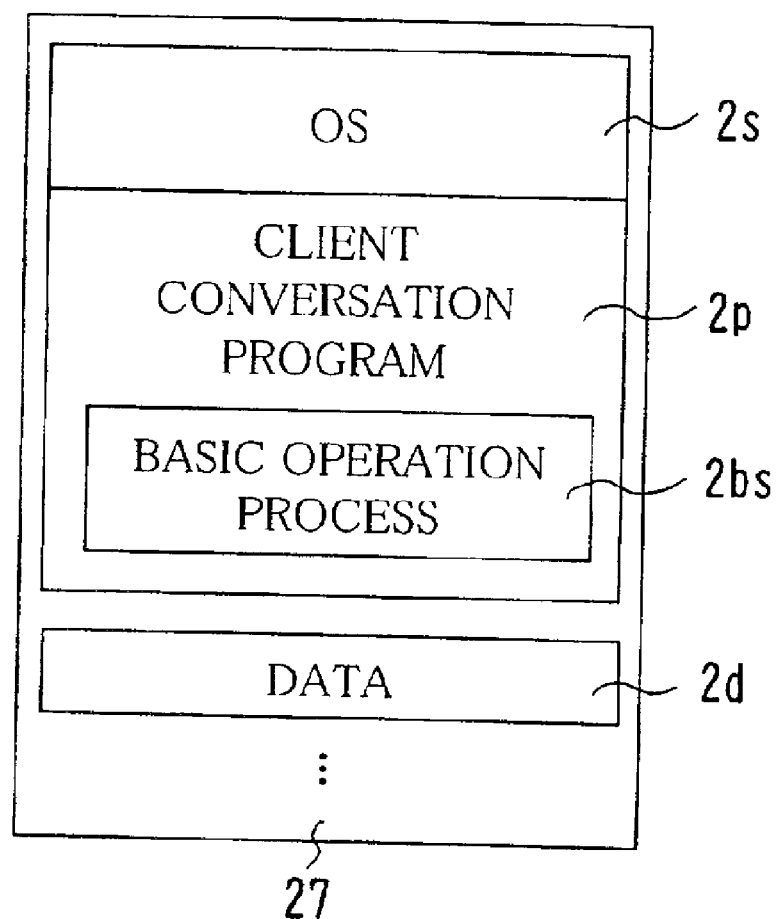
FIG. 2 shows a program stored in a client of a first embodiment.
Figure 3:
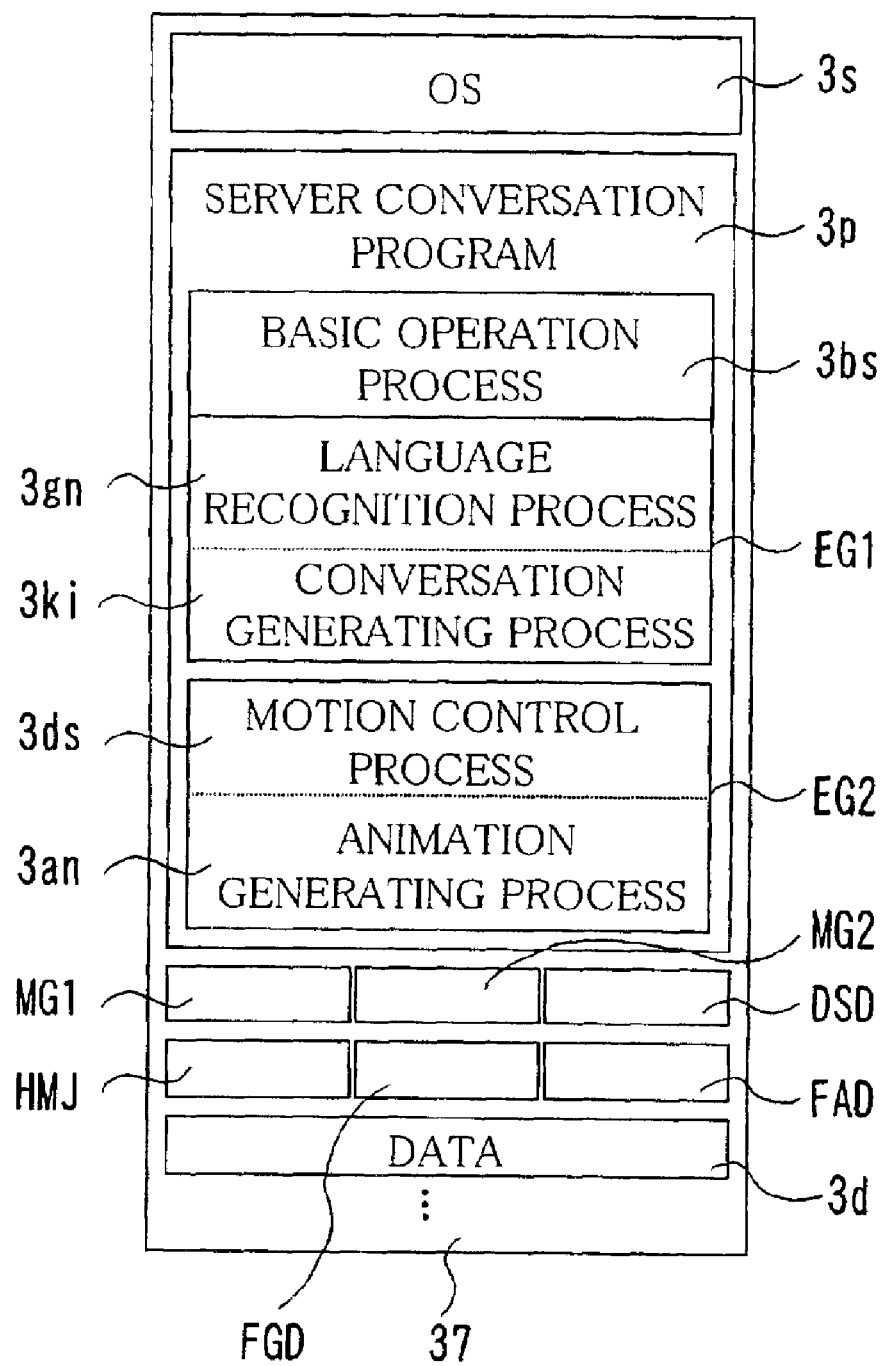
FIG. 3 shows a program stored in a server of the first embodiment.
Figure 4:
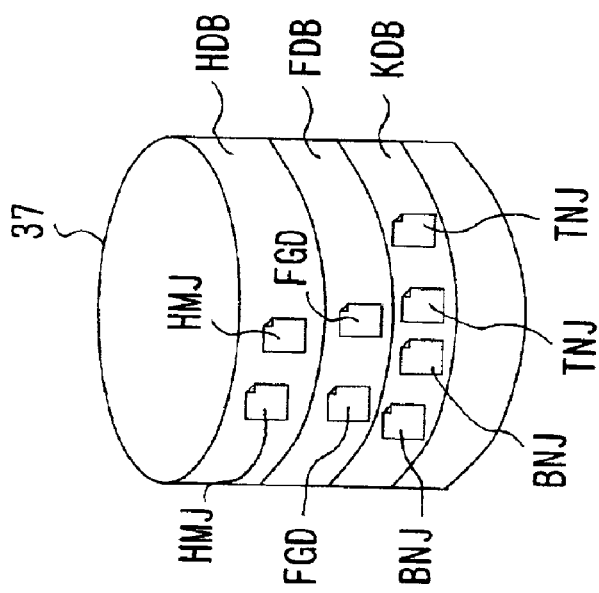
FIG. 4 shows a database provided in a magnetic disk unit of the server.

FIG. 1 is a block diagram showing a whole structure of a communication system 1 according to a first embodiment of the present invention. FIG. 2 shows an example of a program stored in a magnetic disk unit 27 in a client 2. FIG. 3 is a diagram showing an example of a program stored in a magnetic disk unit 37 in a server 3. FIG. 4 shows an example of a database provided in the magnetic disk unit 37 in the server 3. FIG. 5 generally shows an example of a list LST of a person HMN.

As shown in FIG. 1, a communication system 1 comprises a client 2, a server 3, and a network 4.

The client 2 includes a processor 21, a display 22a, a speaker 22b, a mouse 23a, a keyboard 23b, a microphone 23c, a communication controller 24, a CD-ROM drive 25, a floppy disk drive 26 and a magnetic disk unit 27.

The processor 21 has a CPU 21a, a RAM 21b and a ROM 21c so as to execute a series of processes in the client.

The RAM 21b temporarily stores a program or data or the like, while the ROM 21c stores a program and set information of hardware of the client and the like. The CPU 21a executes the programs.

The display 22a displays animation of a face of a person HMN and outputs after-mentioned character data TXT2 in the form of display. The speaker 22b outputs after-mentioned voice data SND2 below as a voice. The mouse 23a and the keyboard 23b are used for inputting a first message MG1 as a message addressed from the user to the person HMN, or for operating the client 2, or the like. The microphone 23c is used for inputting the first message MG1 in the form of the voice.

The communication controller 24 controls transmission and reception of the first message MG1, a second message MG2 which is a message addressed from the person HMN to the user, facial animation data FAD to be described below, and other data. The CD-ROM drive 25, the floppy disk drive 26 and the magnetic disk unit 27 store data and programs.

The server 3 includes a processor 31, a display 32, a mouse 33a, a keyboard 33b, a communication controller 34, a CD-ROM drive 35, a floppy disk drive 36 and a magnetic disk unit 37.

The processor 31 comprises a CPU 31a, a RAM 31b and a ROM 31c. The structure and the function of the processor 31 are the same as those of the above-described processor 21. The communication controller 34 controls transmission and reception of the first message MG1, the second message MG2, the facial animation data FAD and other data.

The network 4 comprises a public line, a private line, a LAN, a wireless line or the Internet. The client 2 and the server 3 are connected with each other via the network 4.

The first message MG1 includes voice data SND1 input from the microphone 23c or character data TXT1 input from the keyboard 33b. The second message MG2 includes the voice data SND2 or the character data TXT2. The facial animation data FAD are information of facial animation comprising images indicating continuous motion of a face of a person HMN.

As shown in FIG. 2, the magnetic disk unit 27 in the client 2 stores an OS 2s as a basic program of the client 2, a client conversation program 2p as an application program of the client in the communication system 1, data 2d required therefor and the like. The client conversation program 2p serves to carry out a basic operation process 2bs and other processes. The basic operation process 2bs is a process for performing linkage with the OS 2s, operations relative to a selection of a person HMN and input of the first message MG1. The programs and data are loaded into the RAM 21b as required so as to be executed by the CPU 21a.

As shown in FIG. 3, the magnetic disk unit 37 in the server 3 stores an OS 3s as a basic program of the server 3, a server conversation program 3p as an application program of the server in the communication system 1, data 3d which are information required therefor and the like.

The server conversation program 3p comprises a basic operation process 3bs, a language recognition conversation engine EG1 and an animation engine EG2. The basic operation process 3bs is a process for performing linkage with the OS 3s. The basic operation process 3bs is also a process for supervising and controlling the language recognition conversation engine EG1 and the animation engine EG2.

The language recognition conversation engine EG1 is a system for performing a language recognition process 3gn and a conversation generating process 3ki and the system is known. The language recognition process 3gn is a process for analyzing the voice data SND1 to extract character data TXTa expressed by natural languages such as Japanese or English. The conversation generating process 3ki is a process for generating the voice data SND2 or the character data TXT2.

In order to produce the voice data SND2, voice data of an identical person or of a substitute person are previously obtained with respect to each of the person HMN. Voice synthesis is performed by the conversation generating process 3ki based on the obtained voice data.

The animation engine EG2 carries out a motion control process 3ds and an animation generating process 3an. Motion control data DSD are generated by the motion control process 3ds. The motion control data DSD are control information for controlling facial image data FGD of the person HMN in such a manner that the facial image data FGD of the person HMN move in accordance with a timing of output of the second message MG2 from the speaker 22b or the display 22a. The animation generating process 3an is a process for generating the facial animation data FAD based on the motion control data DSD and the facial image data FGD.

The programs are suitably loaded into the RAM 31b so as to be executed by the CPU 31a. Further, if required, the RAM 31b temporarily stores the first message MG1, the facial image data FGD, the second message MG2, the motion control data DSD, the facial animation data FAD and the like all of which are used for these processes.

As shown in FIG. 4, the magnetic disk unit 37 is provided with a facial image database FDB, a person information database HDB and a conversation database KDB.

The facial image database FDB accumulates the facial image data FGD of persons HMN. The person information database HDB includes person information HMJ that is information of gender, character, age and the like of each of the persons HMN. The conversation database KDB accumulates sentence information BNJ and word information TNJ as grammar and words for generating sentences for conversation.

Figure 8:
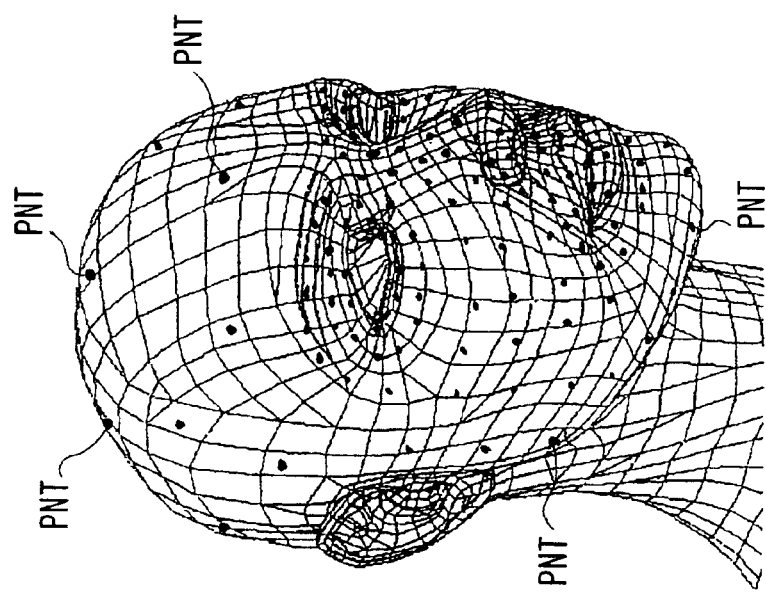
FIG. 8 generally shows an example of facial image data.

The facial image data FGD are data represented by a structured three-dimensional model of a head of a person HMN wherein components such as a mouth, eyes, a nose and ears, skin, muscle and skeleton can move (See FIG. 8). The persons HMN may be various actual or fictional humans, for example, celebrities such as actors, singers, other artists or stars, sport-players and politicians, ancestors of the user and historical figures. It is also possible to use animals, dolls or characters of cartoons.

The facial image data FGD as described above can be produced by various known methods described below.

First, three-dimensional shape data are obtained by using any one of following methods, for example.

(1) A method of presuming a structured facial image based on an ordinary two-dimensional photograph of a face.

(2) A method of calculating a three-dimensional shape by using a plurality of two-dimensional images and data indicating a positional relationship between a subject and a camera used for photographing the images (Stereo photography method).

(3) A method of three-dimensional measurement of a human or a statue by using a three-dimensional measuring apparatus.

(4) A method of producing a three-dimensional computer graphics character anew.

Then, the obtained three-dimensional shape data are converted into a structured three-dimensional model. For the conversion, it is possible to employ methods disclosed in Japanese Unexamined Patent Publication No. 8-297751 and Japanese Unexamined Patent Publication No. 11-328440, and a method disclosed in Japanese Patent Application No. 2000-90629 proposed by the present applicant, for example.

Thus, the structured three-dimensional model is obtained. The form of the structured three-dimensional model can be changed by manipulating its construction points or control points.

Generally, a skin model is used as a three-dimensional model. Muscle and skeleton may be added to the skin model to generate a three-dimensional model. In the three-dimensional model with the muscle and the skeleton, motion of a person can be expressed more realistically by manipulating the construction points or the control points in the muscle or the skeleton. The data of the three-dimensional model mentioned above are the facial image data FGD. A list LST described below is prepared with respect to the facial image data FGD accumulated in the facial image database FDB. The each facial image data FGD can be specified by a person number NUM or the like in the list LST.

As shown in FIG. 5, the list LST is a database for storing information of a plurality of persons HMN who can be persons with whom the user converses. The list LST includes a plurality of fields, for example, the person number NUM for discriminating each of the persons HMN, a person name NAM as a name of the person corresponding to the person number NUM and a sample image SMP indicating an example of a facial image. The list LST stores data concerning the persons HMN such as a person HMN1 and a person HMN2.

Next, processes and operations performed in the communication system 1 at conversing with a person HMN will be described with reference to flowcharts.

Figure 6:
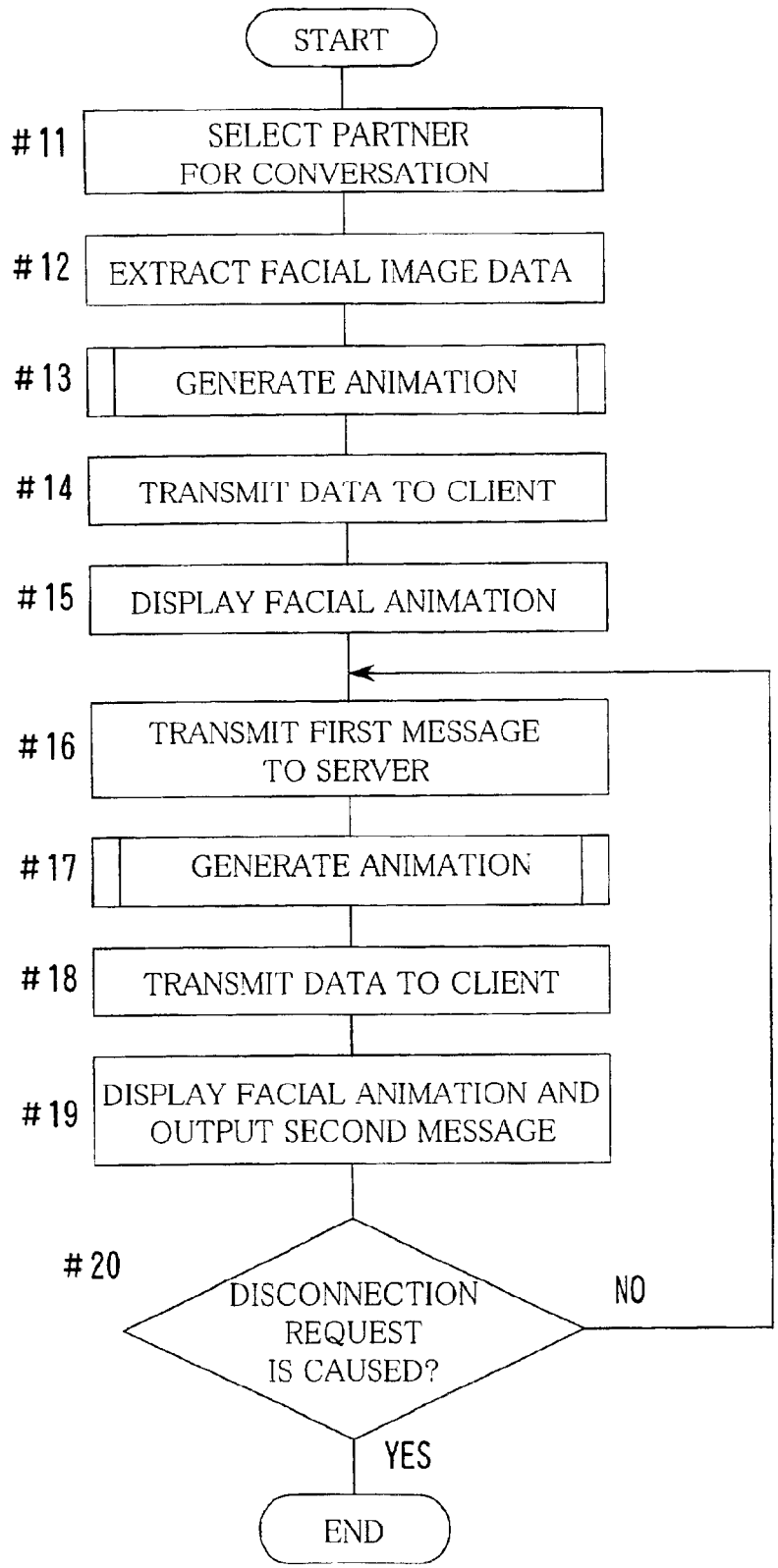
FIG. 6 is a flowchart showing a process of a communication system of the first embodiment.
Figure 7:
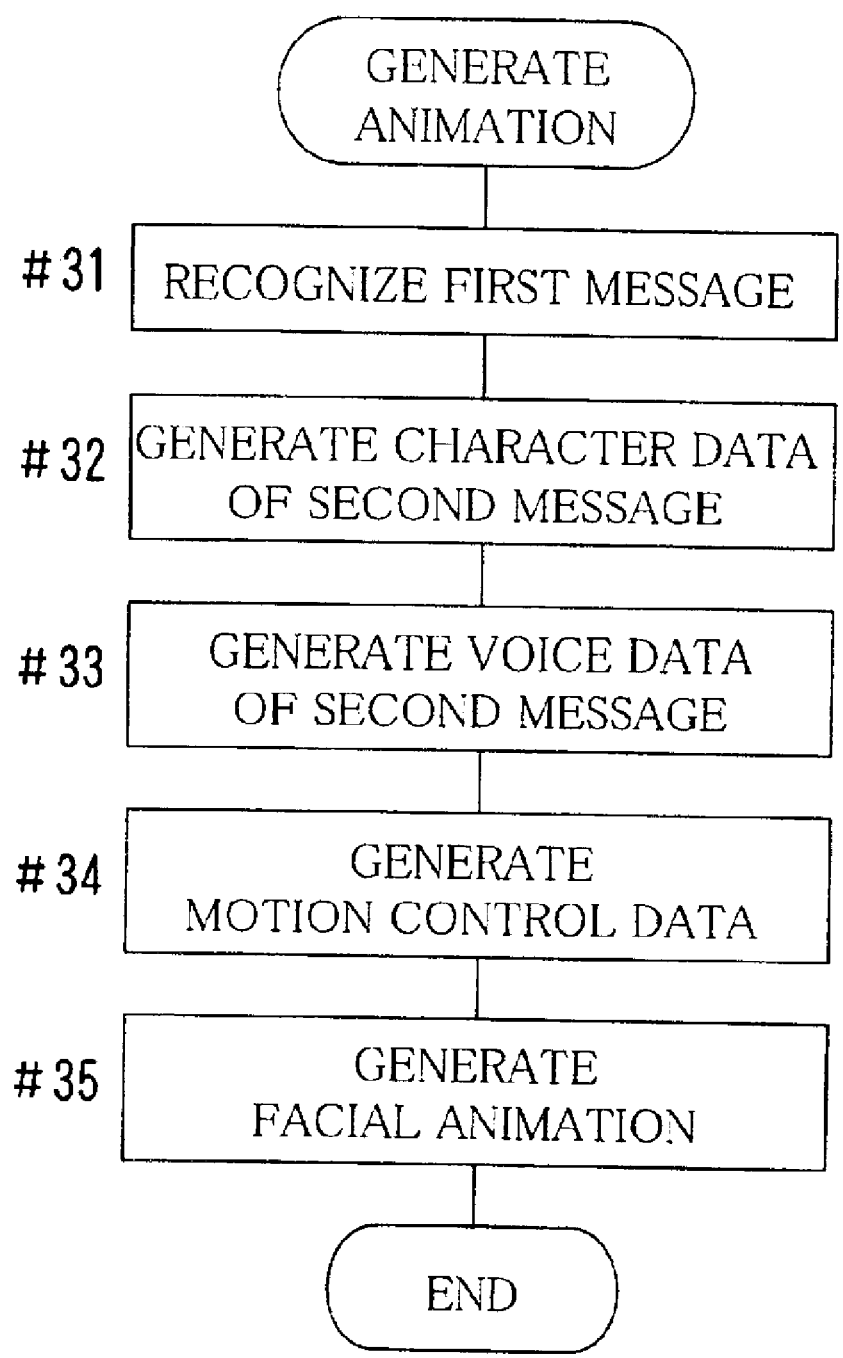
FIG. 7 is a flowchart showing a process for generating facial animation data and a second message.

FIG. 6 is a flowchart showing a process of the communication system 1 of a first embodiment. FIG. 7 is a flowchart showing a process for generating facial animation data FAD and a second message MG2. FIG. 8 generally shows an example of facial image data FGD1.

As shown in FIG. 6, a user operates a mouse 23a or a keyboard 23b in a client 2 to select from a list LST a person HMN with whom the user converses (#11). A person number HMN of the selected person HMN is transmitted to a server 3 at this point. The list LST may be provided from the server 3 via a network 4, previously stored in a magnetic disk unit 27 as shown in FIG. 1 or provided by media such as a CD-ROM, a floppy disk or the like.

In the server 3, animation of a person HMN to be displayed before starting a conversation is generated. First, facial image data FGD and person information HMJ corresponding to data of the received person number HMN are extracted from a facial image database FDB and a person information database HDB (#12).

Next, facial animation data FAD are generated based on the extracted facial image FGD and the person information HMJ (#13) so as to be transmitted to the client 2 (#14). In the client 2, the received facial animation data FAD are displayed on a display 22a as an initial state of the person HMN (#15).

The second message MG2 may be generated along with the production of the facial animation data FAD so as to be transmitted to the client 2 together with the facial animation data FAD. Further, in the client 2, the second message MG2 may be output from a speaker 22b at the same time with displaying the facial animation data FAD.

A method for generating the facial animation data FAD and the second message MG2 will be described later in this specification.

The user watches the person HMN displayed on the display 22a to talk to the person HMN. Specifically, in the client 2, a first message MG1 is input via a microphone 23c or the keyboard 23b so that the input first message MG1 is transmitted to the server 3 (#16).

The user may start the conversation first, with omitting the steps #13 to #15.

In the server 3, next facial animation data FAD and the second message MG2 are generated based on the received first message MG1, the facial image data FGD and the person information HMJ (#17) so that the generated data are transmitted to the client 2 (#18).

In the client 2, the display 22a or the speaker 22b outputs the facial animation data FAD and the second message MG2 (#19).

In the case where a disconnection request for stopping the conversation with the person HMN is caused (Yes in #20), the process is finished. On the other hand, if no disconnection request is caused, the process returns to the step #16 so that the conversation (dialogue) between the user and the person HMN is repeated.

Here, a method for generating the animation or the like performed in the steps #13 and #17 is described.

The facial image data FGD used in the present embodiment are data represented by a three-dimensional model wherein components such as a mouth, eyes, a nose and ears, skin, muscle and skeleton are structured so as to move.

The facial image data FGD1 shown in FIG. 8 illustrates a three-dimensional model of skin. The three-dimensional model of skin comprises multiple polygons for forming the skin of the face (head) of the person HMN and a plurality of control points PNT for controlling facial motions.

Turning to FIG. 7, the received first message MG1 is recognized in the server 3 (#31). In the case where the first message MG1 comprises character data TXT1, it is unnecessary to perform a language recognition process 3gn. If the first message MG1 comprises voice data SND1, the language recognition process 3gn is performed by using a language recognition conversation engine EGI so as to generate character data TXTa. If, however, the first message MG1 is not received yet as shown in the step #13, or if the conversation is interrupted for a predetermined period of time, the step #31 is omitted.

The second message MG2 is generated in order to respond to the first message MG1. Specifically, a conversation generating process 3ki is performed by using the language recognition conversation engine EG1 so as to generate character data TXT2 (#32), and voice data SND2 are then generated based on the produced character data TXT2.

The character data TXT2 are generated with reference to the character data TXTa or TXT1, sentence information BNJ and word information TNJ. In the case where the character data TXTa or TXT1 are 'How are you?', for example, sentence information BNJ having possibilities that the person HMN responds to the question is extracted from a conversation database KDB with reference to the person information HMJ so as to apply the word information TNJ to the sentence information BNJ. Thus, the character data TXT2 such as 'Fine, thank you. How about yourself?' or 'OK, but I am a little bit tired. Are you all right?' are generated.

Conversion from the character data TXT2 to the voice data SND2 is performed by using known techniques. However, if the first message MG1 is not received yet as shown in the step #13, or if the conversation is interrupted for a prejudged period of time, character data TXT2 having possibilities that the person HMN talks to the user are generated with reference to the person information HMJ, the sentence information BNJ, and the word information TNJ in the step #32. Such character data TXT2 include 'Hello.' or 'Is everything OK with you?'.

Motion control data DSD are produced by using an animation engine EG2 (#34) so as to generate the facial animation data FAD (#35). The motion control data DSD are obtained by executing a motion control process 3ds.

For example, it is possible to synchronize the facial image data FGD with the voice data SND2 by utilizing the technique disclosed in Japanese Unexamined Patent Publication No. 10-293860 that is described in description of the prior art of the present specification. The facial image data FGD are caused to move based on the motion control data DSD by performing an animation generating process 3an, to thereby generate of the facial animation data FAD.

In the case of the facial image data FGD1 shown in FIG. 8, the facial image data FGD are caused to move by controlling the control points PNT.

To send the facial animation data FAD, the data may be compressed by, for example, the MPEG or like encoding methods.

As described above, according to the first embodiment, facial animation data FAD are generated by a server 3 so as to be transmitted to a client 2. Since the client 2 have only to receive and display the generated data, burden accompanying the data processing is relatively small. Accordingly, even if the client 2 has difficulties with production of animation due to low performance or low specifications thereof, it is possible to perform a conversation with a person HMN by using the client 2.

Second Embodiment

A whole structure of a communication system 1B of a second embodiment is the same as in the first embodiment, therefore, FIG. 1 is also applied to the second embodiment. However, the second embodiment differs from the first embodiment in a program that is stored in a magnetic disk unit 27 of a client 2B and a magnetic disk unit 37 of a server 3B, and contents processed by processors 21 and 31.

Specifically, in the first embodiment, facial image data FGD extracted from a facial image database FDB in the server 3B are temporarily stored in a RAM 31B or the magnetic disk unit 37 in the server 3B. In turn, in the second embodiment, the facial image data FGD are transmitted to the client 2B so as to be temporarily stored in a RAM 21b or the magnetic disk unit 27 in the client 2B. Then, facial animation data FAD are generated in the client 2B based on motion control data DSD transmitted from the server 3B.

Figure 9:
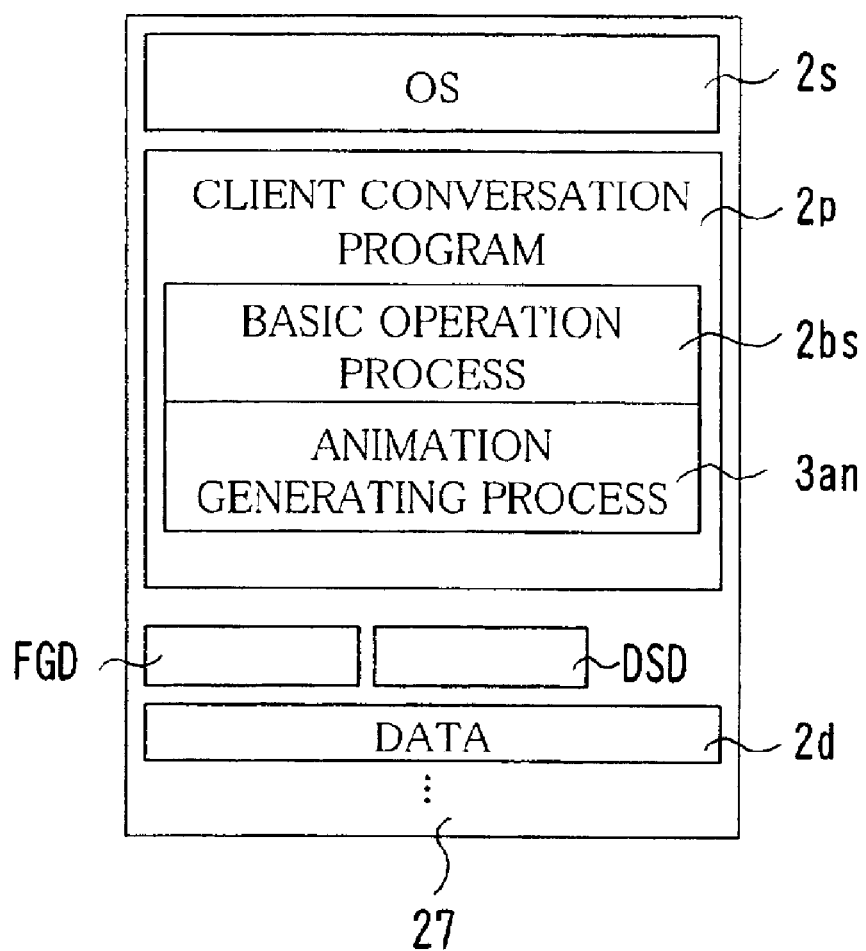
FIG. 9 shows a program stored in a client of a second embodiment.
Figure 10:
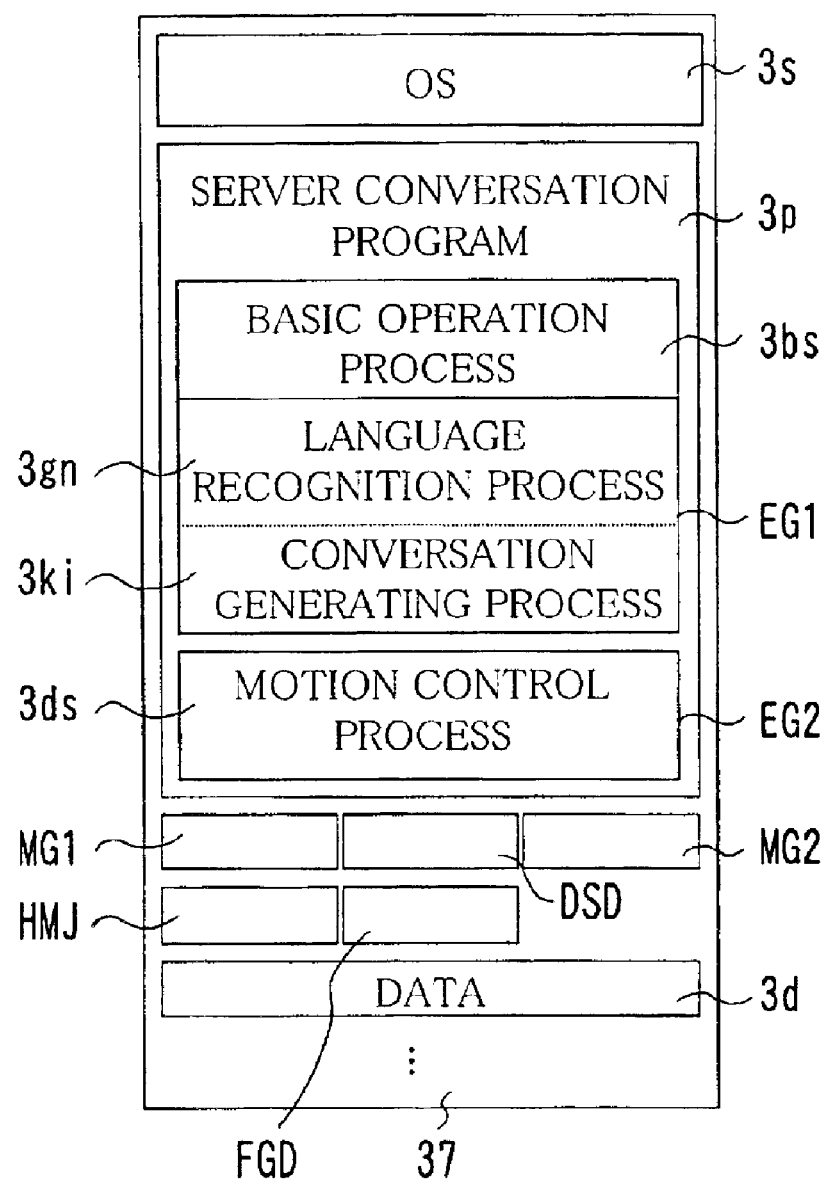
FIG. 10 shows a program stored in a server of the second embodiment.

FIG. 9 shows an example of a program stored in the magnetic disk unit 27 according to the second embodiment. FIG. 10 shows an example of a program stored in the magnetic disk unit 37 of the second embodiment.

In FIGS. 9 and 10, portions having the same function as in the first embodiment is denoted by the same reference characters and descriptions therefor are omitted or simplified. The same thing can be applied to other drawings in the present embodiment.

As shown in FIG. 9, the magnetic disk unit 27 stores an animation generating process 3an for generating animation of a person's face and the facial image data FGD as well as the motion control data DSD transmitted from the server 3B.

As shown in FIG. 10, a server conversation program 3p stored in the magnetic disk unit 37 comprises a basic operation process 3bs, a language recognition conversation engine EG1 and an animation engine EG2 in the same manner as in the first embodiment. Although the animation engine EG2 performs a motion control process 3ds, the animation generating process is not performed therein.

Next, processes and operations performed in the communication system 1B at conversing with the person HMN will be described with reference to flowcharts.

Figure 11:
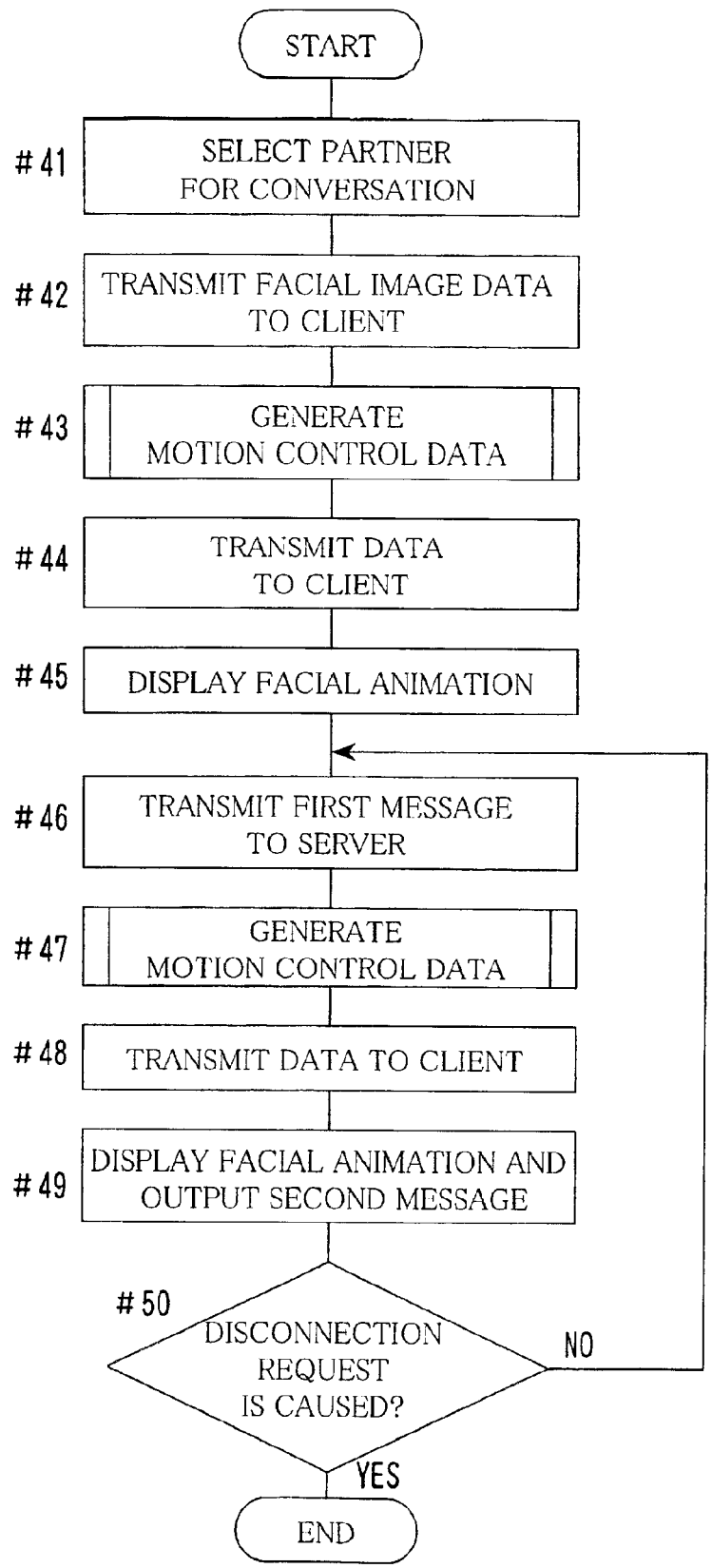
FIG. 11 is a flowchart showing a process of a communication system of the second embodiment.
Figure 12:
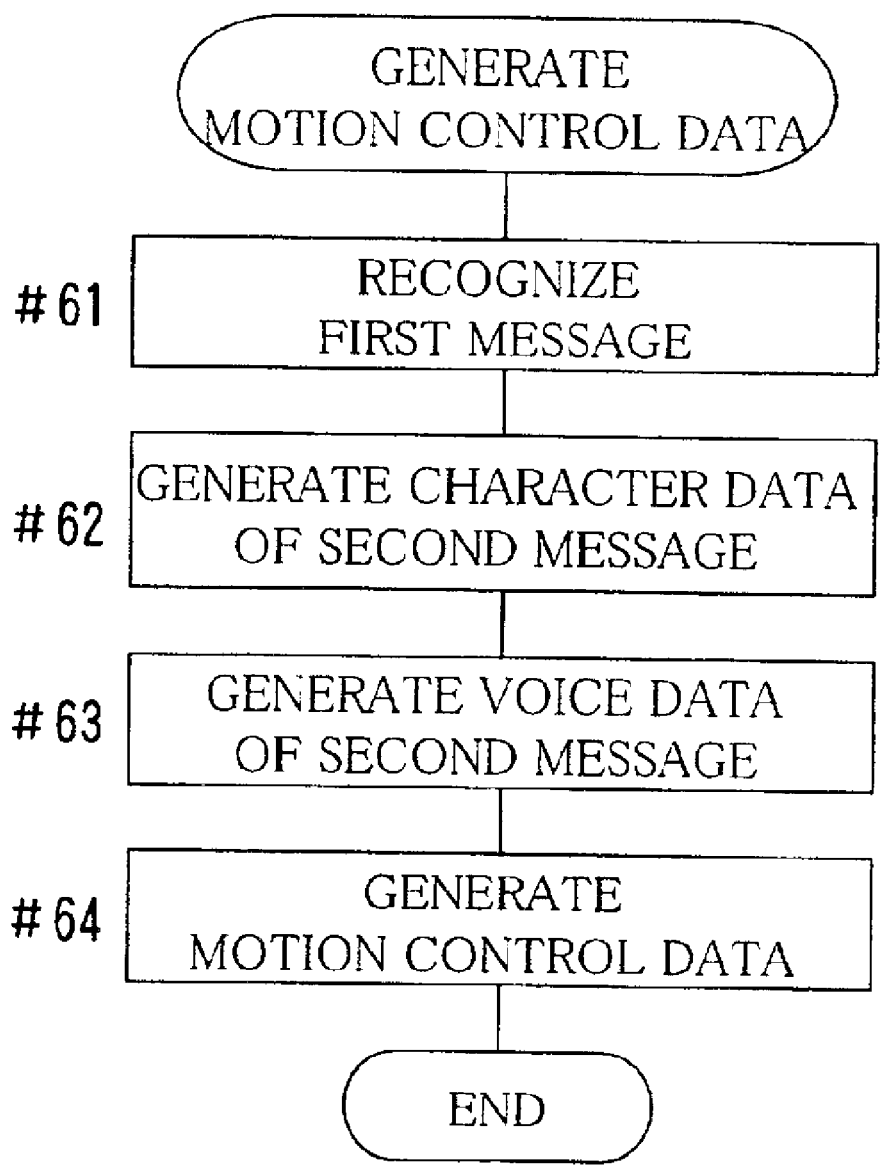
FIG. 12 is a flowchart showing a process for generating motion control data and a second message.

FIG. 11 is a flowchart showing a process of the communication system 1B of the second embodiment. FIG. 12 is a flowchart showing a process for generating the motion control data DSD and a second message MG2.

As shown in FIG. 11, in the client 2B, a person HMN with whom a user converses is selected from a list LST (#41). A person number NUM of the selected person HMN is sent to the server 3B at this point. After reception of the person number NUM, the server 3B reads facial image data FGD corresponding to the person number NUM from the facial image database FDB so as to transmit the facial image data FGD to the client 2B (#42). Such preprocesses for performing a conversation are automatically carried out as background processes.

In the server 3B, the motion control data DSD are generated (#43) so as to be transmitted to the client 2B (#44). In the client 2B, the facial image data FGD are caused to move based on the motion control data DSD, thereby, the facial animation data FAD are generated at the same time with being displayed on a display 22a (#45).

In addition, the second message MG2 and the motion control data DSD may be concurrently generated in the server 3B so as to be transmitted to the client 2B, and the second message MG2 may be output from a speaker 22b together with display of the facial animation data FAD in the client 2B.

A first message MG1 is input in the client 2B for transmission to the server 3B (#46). In the server 3B, the motion control data DSD and the second message MG2 are generated based on the first message MG1 and person information HMJ (#47). The generated data are sent to the client 2B (#48).

The facial image data FGD are output to the display 22a with the data being caused to move based on the motion control data DSD, and at the same time, the second message MG2 is output to the display 22a or the speaker 22b (#49).

The conversation between the user and the person HMN is repeated until a disconnection request is caused (#46–#50).

Referring to FIG. 12, a method for generating the motion control data or the like that are performed in the steps #43 and #47 is described.

In the server 3B, a received first message MG1 is recognized (#61). Character data TXT2 are generated (#62) and voice data SND2 are produced based on the generated character data TXT2 so that the second message MG2 is generated (#63). In addition, the motion control data DSD are generated by using the animation engine EG2.

As described above, in the communication system 1B of the second embodiment, facial image data FGD extracted at the server 3B are transmitted to the client 2B. Then, in the client 2B, the facial image data FGD are caused to move based on motion control data DSD so that animation is produced. Thus, it is possible to reduce communications traffic of data between the server 3B and the client 2B and to display animation at a high speed according to the second embodiment.

Third Embodiment

A whole structure of a communication system 1C according to a third embodiment is the same as in the second embodiment. Accordingly, FIG. 1 is also applied to the third embodiment. Contents of programs memorized in magnetic disk units 27 and 37 are substantially the same as those of the second embodiment shown in FIGS. 9 and 10. However, since data stored in the magnetic disk units 27 and 37 that are provided in a client 2C and a server 3C are different from those of the second embodiment, contents processed by the client 2C and the server 3C are somewhat different.

More specifically, in the third embodiment, a facial image database FDB is provided in the client 2C and the client 2C performs extraction and temporary storage of facial image data FGD and generation of facial animation data. The server 3C generates motion control data DSD and a second message MG2 based on a first message MG1 sent from the client 2C.

Figure 13:
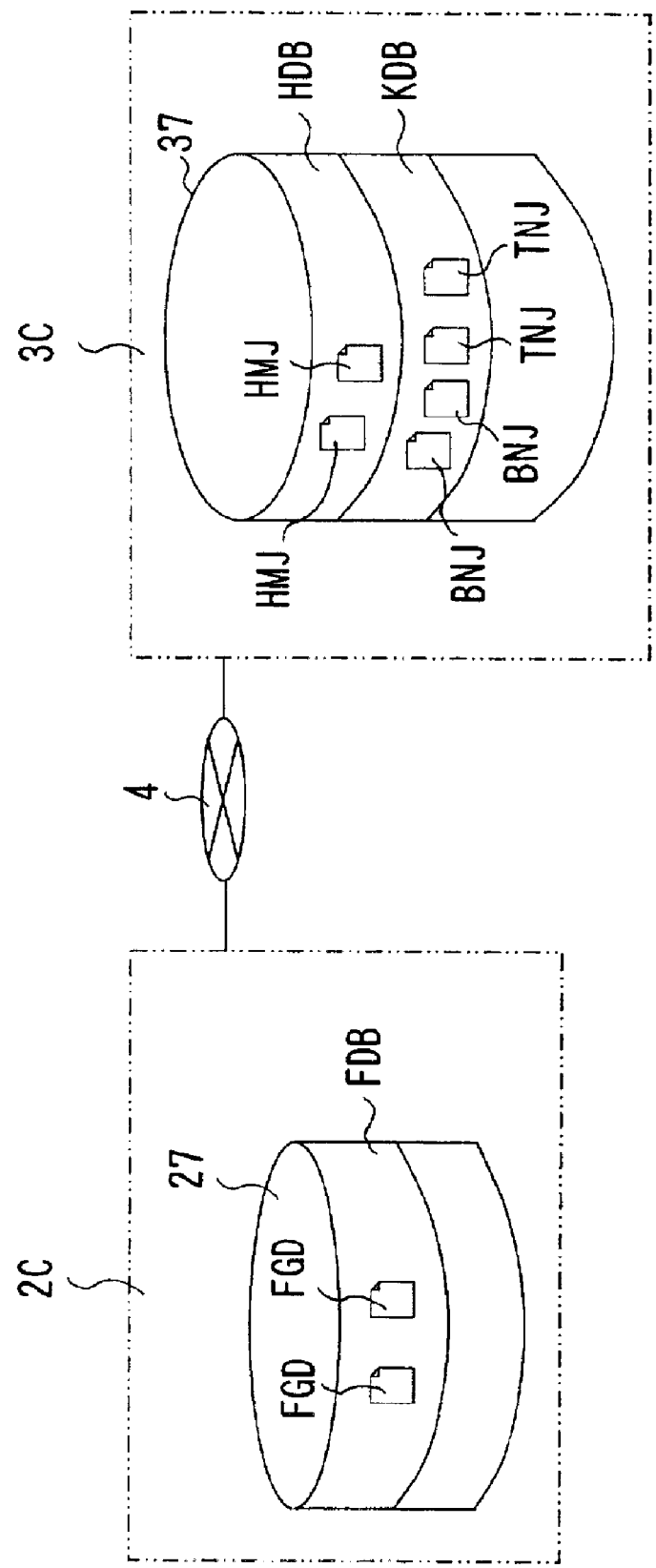
FIG. 13 is a block diagram showing databases stored in each magnetic disk unit of a client and a server according to a third embodiment.

FIG. 13 shows an example of databases provided in the magnetic disk unit 27 of the client 2c and the magnetic disk unit 37 of the server 3C according to the third embodiment.

As shown in FIG. 13, the facial image database FDB is provided only in the magnetic disk unit 27 of the client 2c, and not provided in the magnetic disk unit 37 of the server 3C.

The process contents in the communication system 1C of the third embodiment are substantially the same as those shown in the flowchart of FIG. 11 of the second embodiment. Only differences will be described below.

In the step #42 shown in FIG. 11, the facial image data FGD are read from the facial image database FDB provided in the magnetic disk unit 27 of the client 2C for temporary storage. The transmission of the facial image data FGD is not performed. Other process contents in the communication system 1C are the same as those shown in FIG. 11.

As described above, in the communication system 1C of the third embodiment, the provision of the facial image database FDB in the magnetic disk unit 27 of the client 2C eliminates the need to transmit the facial image data FGD from the server 3C. Accordingly, it is possible to shorten the time taken to start a conversation.

According to the three embodiments described above, it is possible to converse remotely with a fictional person or the like with reducing load of processes performed by the client 2 since the second message MG2 is produced in the server 3.

Since the facial image data FGD are structured in three-dimensional, motion and emotional expressions of the face are variable and natural. Facial animation representing understanding about what a user talks responds to the user with emotional expressions comprised of three-dimensional images and voices and, therefore, the user can enjoy interactive talk.

In addition, it is possible to realize service of conversing with historical figures and late blood-relative by the selection of the person HMN. When a user selects 'ancestors' from the facial image database FDB as the person HMN, for example, the user can realistically enjoy conversing with the facial animation of the late ancestor.

In the case where a person HMN is an actual celebrity, a conversation between the celebrity and a plenty of fans can be realized without bothering the celebrity's private life.

In the language recognition conversation engine EG1, contents of a conversation are set in accordance with kinds of persons HMN such as ancestors, celebrities, historical figures and the like. Thus, a meaningful conversation can be performed between the user and the person HMN.

Further, by keeping the server 3 in constant operation, the user can enjoy conversing with a person HMN irrespective of time and place.

Additionally, since the maintenances of the conversation database KDB can be carried out in the server 3, it is possible to easily respond to up-to-date topics, vogue phrases and the like without special maintenances in the client 2.

In the above-described embodiments, the server 3 generates voice of a person HMN. However, it is also possible to generate only the character data TXT2 at the server 3 and produce the voice data SND2 at the client 2.

A workstation or a personal computer can be used as the server 3 and the client 2 in the above-described embodiments. As the client 2, there can be used devices with communication facility such as a portable phone, mobile devices and like devices.

Each part or whole part of structure, circuit, process contents, processing order and contents of a conversation in the communication systems 1, 1B and 1C can be suitably modified in accordance with the sprit and scope of the present invention.

Other two embodiments of a communication system will be described. In communication systems 1D and 1E according to the two embodiments, a conversation is performed with watching facial animation that is a partner's avatar (substitute) instead of an actual facial image of the partner of conversation. Although a personal computer is used as a terminal device in the communication systems 1D and 1E, other communication equipment such as a telephone, a portable phone, mobile devices can be used as the terminal device.

Fourth Embodiment

Figure 15:
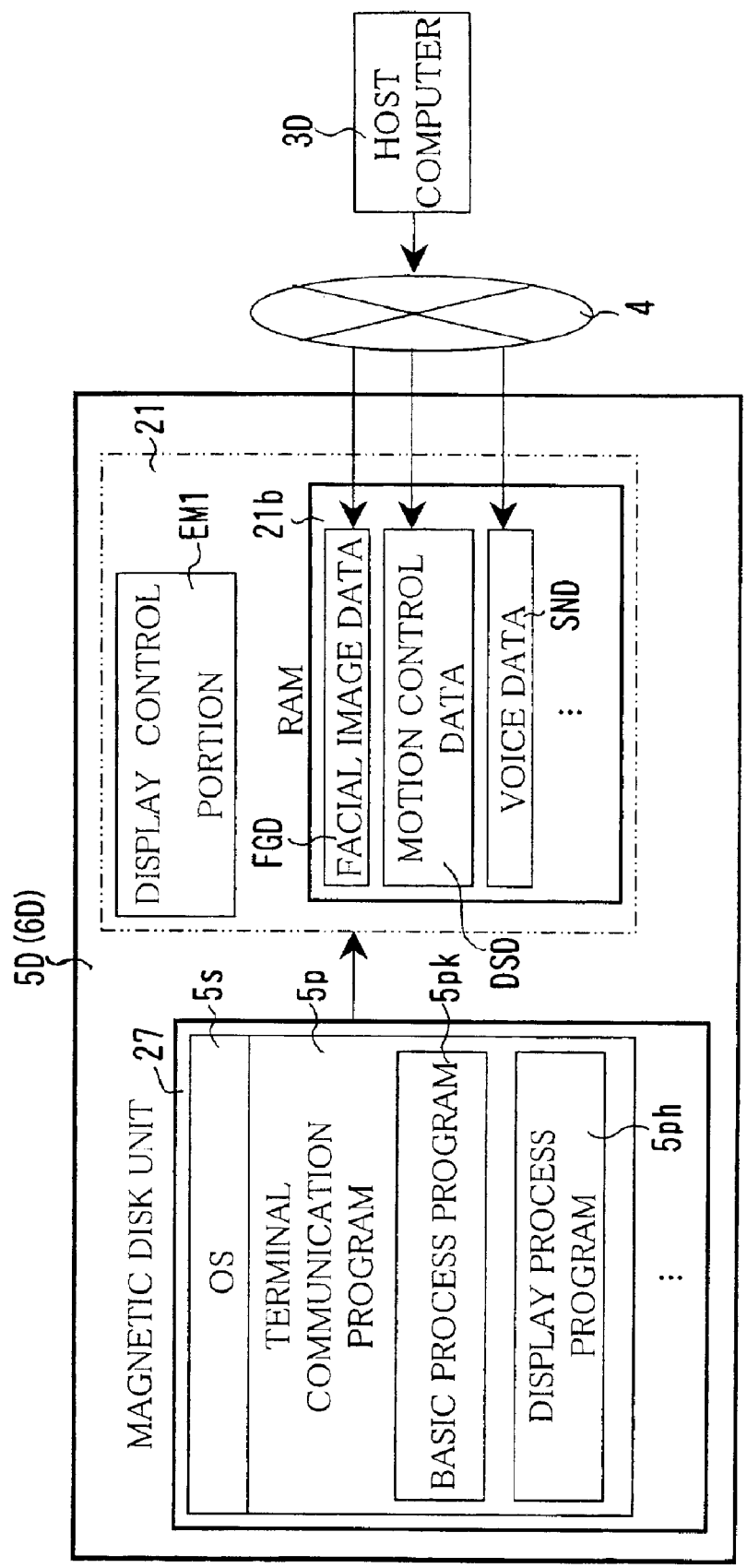
FIG. 15 shows an example of a program and data stored in a terminal device.
Figure 16:
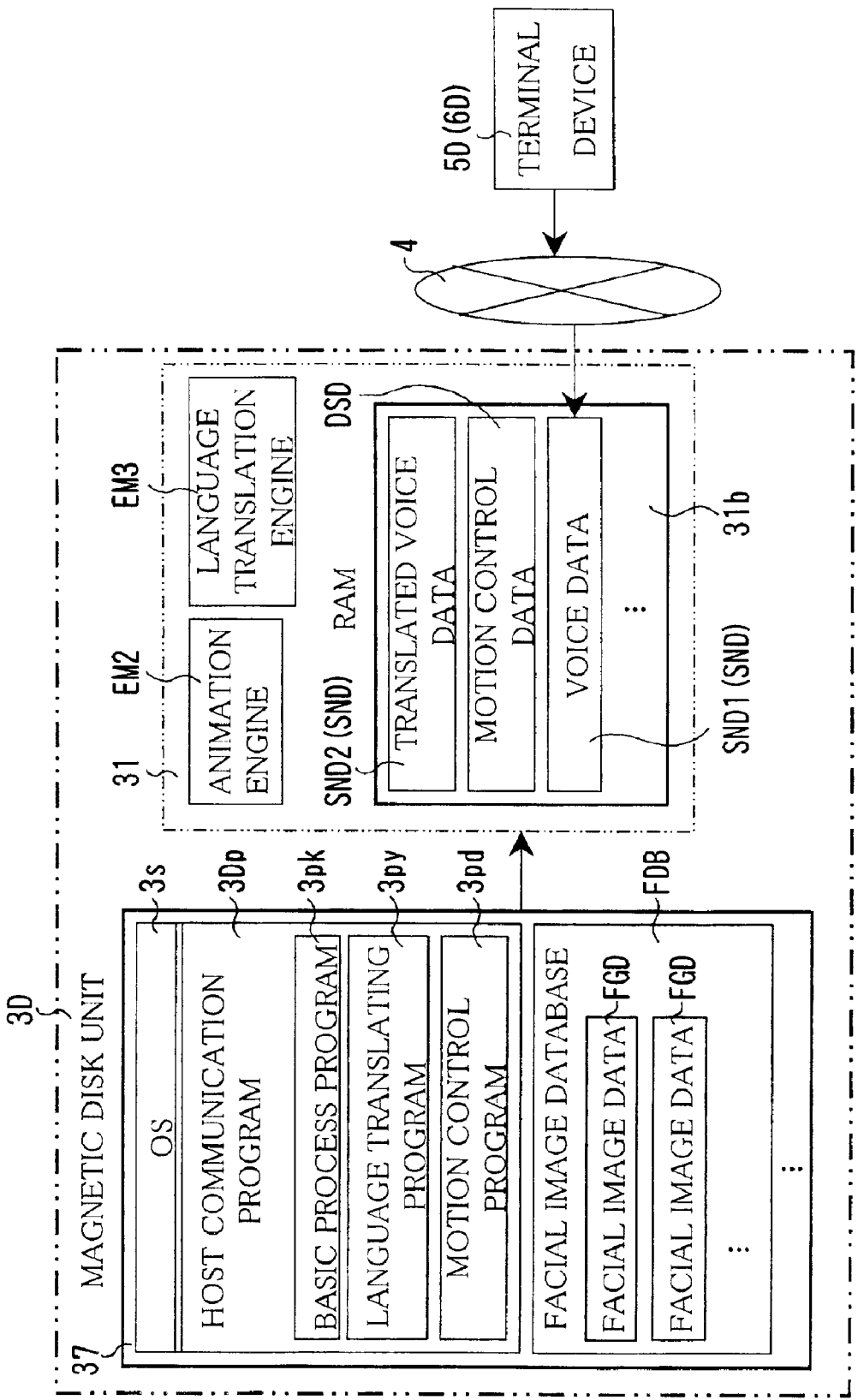
FIG. 16 shows an example of a program and data stored in a host computer.

FIG. 14 is a block diagram showing a whole structure of a communication system 1D according to a fourth embodiment of the present invention. FIG. 15 shows an example of a program and data stored in terminal devices 5D and 6D of the fourth embodiment. FIG. 16 shows an example of a program and data stored in a host computer 3D of the fourth embodiment.

As shown in FIG. 14, the communication system 1D comprises the terminal devices 5D and 6D, the host computer 3D and a network 4. A plurality of terminal devices is provided in the communication system 1D and only the terminal devices 5D and 6D are illustrated in FIG. 14.

The terminal devices 5D and 6D each include a processor 21, a display 22a, a speaker 22b, a mouse 23a, a keyboard 23b, a microphone 23c, a communication controller 24, a CD-ROM drive 25, a floppy disk drive 26 and a magnetic disk unit 27.

The processor 21 has a CPU 21a, a RAM 21b and a ROM 21c and serves to carry out a series of processes in the terminal devices 5D and 6D.

The RAM 21b temporarily stores a program, data and the like and the ROM 21c stores a program, information about setting of hardware of the terminal devices 5D and 6d and the like. The CPU 21a executes the programs.

The display 22a is used for displaying facial animation and the speaker 22b is used for outputting voice of a partner. The mouse 23a and the keyboard 23b are used for operation of the terminal devices 5D and 6D and the microphone 23c is used for inputting voice.

The communication controller 24 controls transmission and reception of facial image data FGD as three-dimensional shape data of a face, motion control data DSD used for controlling the facial image data FGD in such a manner that the facial image data FGD move in accordance with a timing of the output of the voice, voice data SND obtained by digital conversion of voice and other data. The CD-ROM drive 25, the floppy disk drive 26 and the magnetic disk unit 27 all stores data and a program.

The host computer 3D includes a processor 31, a display 32, a mouse 33a, a keyboard 33b, a communication controller 34, a CD-ROM drive 35, a floppy disk drive 36 and a magnetic disk unit 37.

The processor 31 has a CPU 31a, a RAM 31b, a ROM 31c and the like. The structure and the function of the processor 31 are the same as in the processor 21 described above.

The network 4 may comprise a public line, a private line, a LAN, a wireless line or the Internet. Each of the terminal devices 5D and 6D is connected to the host computer 3D via the network 4.

As shown in FIG. 15, each of the magnetic disk units 27 of the terminal devices 5D and 6D stores an OS 5s as a basic program of the terminal device, a terminal communication program 5p as an application program of the terminal device in the communication system 1D, other necessary programs and data.

The terminal communication program 5p includes programs such as a basic process program 5pk and a display process program 5ph or a module. The basic process program 5pk performs processes concerning operations at a user's side such as linkage with the OS 5s. Choice of the facial image data FGD and the like. The display process program 5ph serves to move the facial image data FGD based on the motion control data DSD in order to generate animation.

The programs are suitably loaded into the RAM 21b and executed by the CPU 21a. The received facial image data FGD, the received motion control data DSD and the received voice data SND are stored in the RAM 21b. In addition, the data are stored in the magnetic disk unit 27, if required.

The display control portion EM1 which is a series of systems for displaying animation is realized as a result of the execution of the various programs on the RAM 21b as described above.

As shown in FIG. 16, the magnetic disk unit 37 provided in the host computer 3D stores an OS 3s as a basic program of the host computer 3D, a host communication program 3Dp that is an application program of the host computer in the communication system 1D and other necessary programs and data. A facial image database FDB is provided for accumulating the facial image data FGD.

The host communication program 3Dp includes programs such as a basic process program 3pk, a motion control program 3pd and a language translating program 3py or a module. The basic process program 3pk performs linkage with the OS 3s, supervises and controls an animation engine EM2 and a language translation engine EM3. The motion control program 3pd generates the motion control data DSD based on the voice data SND. The motion control data DSD are control information used for controlling the facial image data FGD in such a manner that the facial image data FGD move in accordance with a timing of the output of the voice based on the voice data SND. The language translating program 3py is used for translation from voice data SND of a natural language to voice data SND of another natural language.

The programs are suitably loaded into the RAM 31b and executed by the CPU 31a. Data such as the received voice data SND are stored in the RAM 31b.

The animation engine EM2 as a series of systems for generating the motion control data DSD and the language translation engine EM3 as a series of systems for translating the voice data SND to another language are realized as a result of the execution of the various programs on the RAM 31b as described above.

Original voice data are sometimes referred to as 'voice data SND1' and translated voice data are sometimes referred to as 'voice data SND2' in order to be distinguished from each other in the present specification. As to automatic translation of languages, reference may be given to Japanese Unexamined Patent Publication No. 1-211799, for example.

The facial image data FGD are data represented by a structured three-dimensional model of a head of a human wherein components thereof such as a mouth, eyes, a nose and ears, skin, muscle and skeleton can move. An example of the facial image data FGD is shown in FIG. 8. The facial image data FGD and the structured three-dimensional model are as described in the first embodiment.

Partner's avatar is generated based on the facial image data FGD. As the facial image data FGD, it is possible to use actual or fictional objects such as artists, sport players and like celebrities, historical figures, animals and characters in cartoons in addition to a user's face.

Next, processes and operations performed in the communication system 1D in the case of a conversation between a user of one terminal device 5D and a user of the other terminal device 6D will be described with reference to flowcharts.

Figure 17:
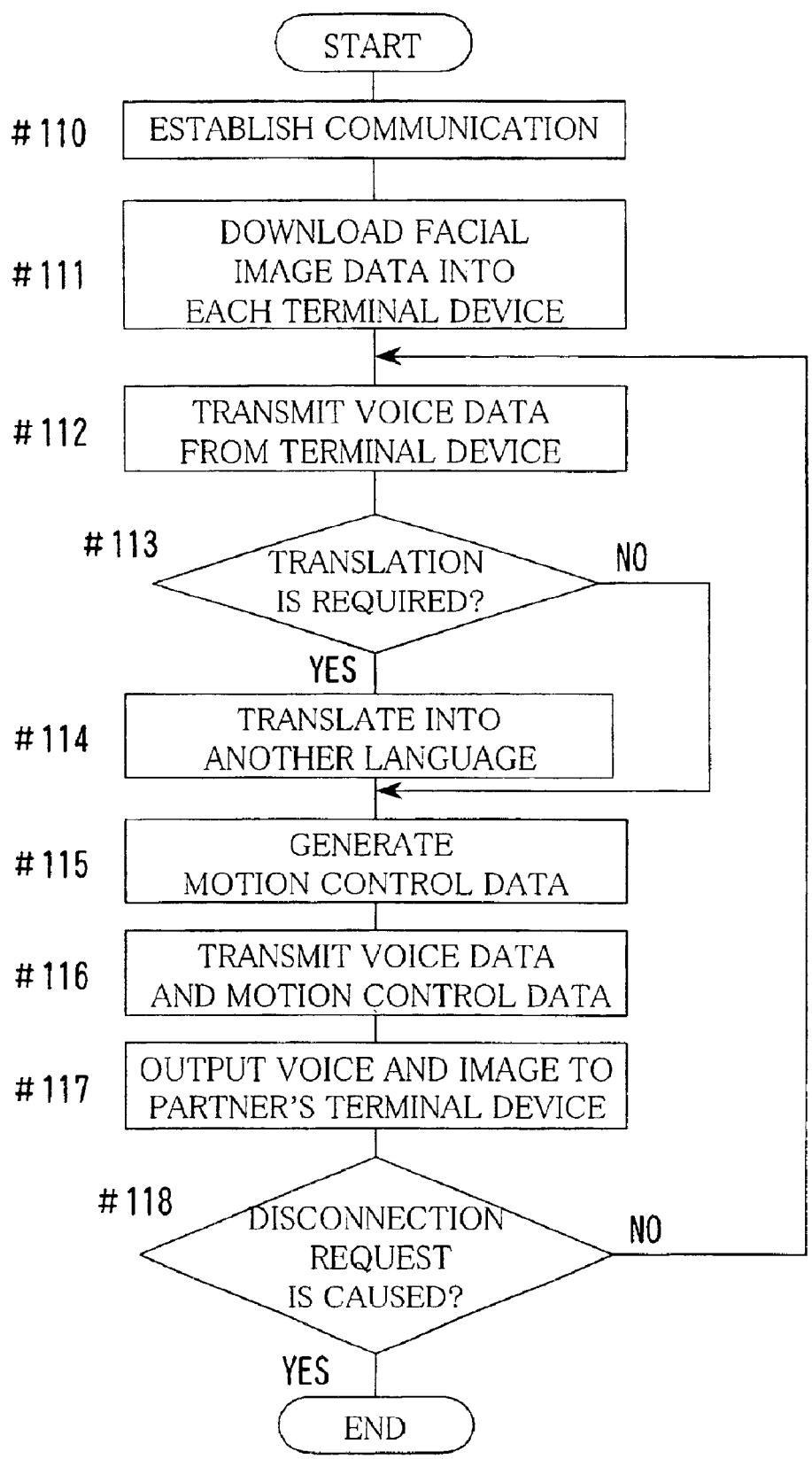
FIG. 17 is a flowchart showing a process of the communication system.
Figure 18:
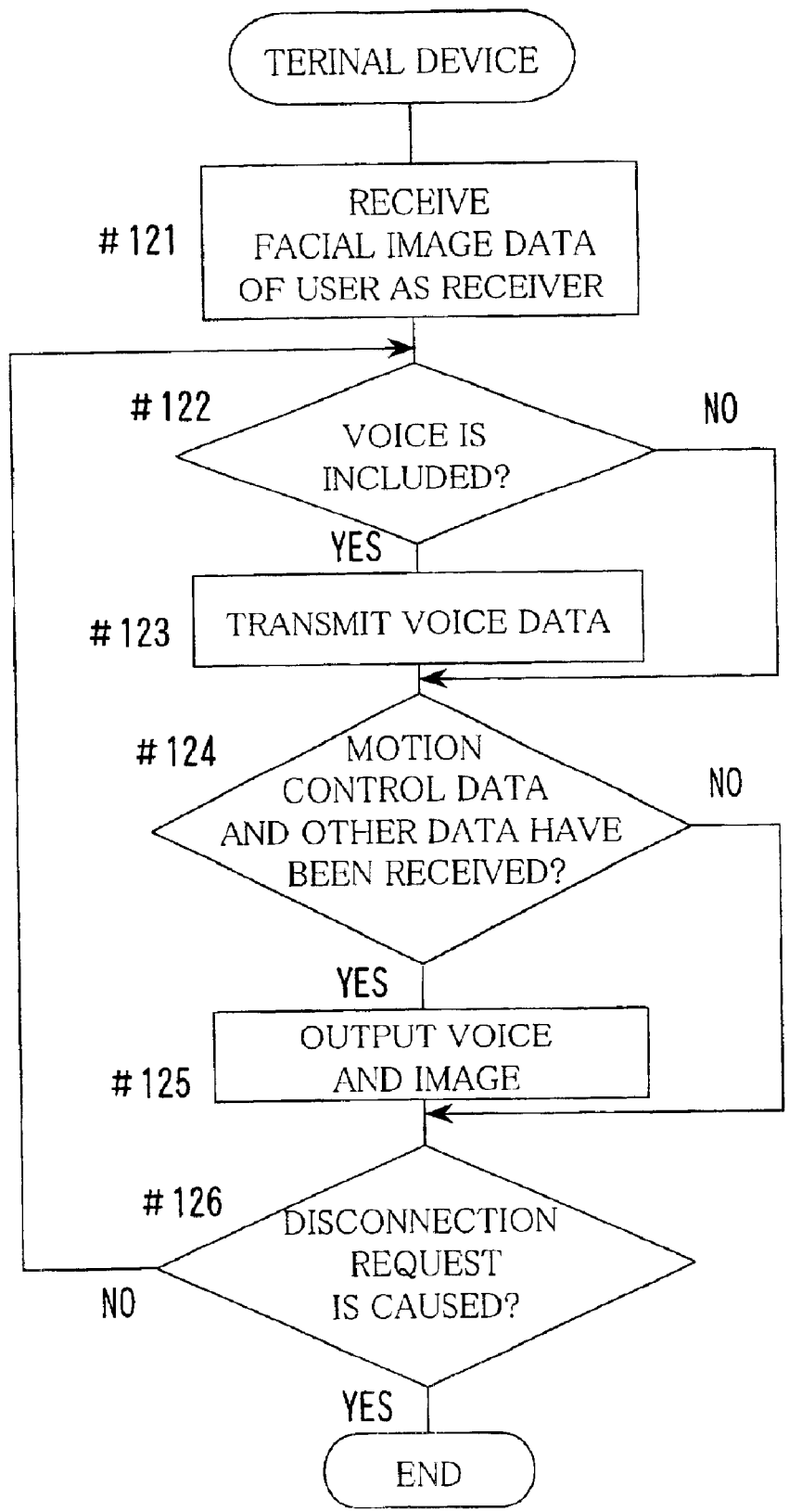
FIG. 18 is a flowchart showing a process of the terminal device.
Figure 19:
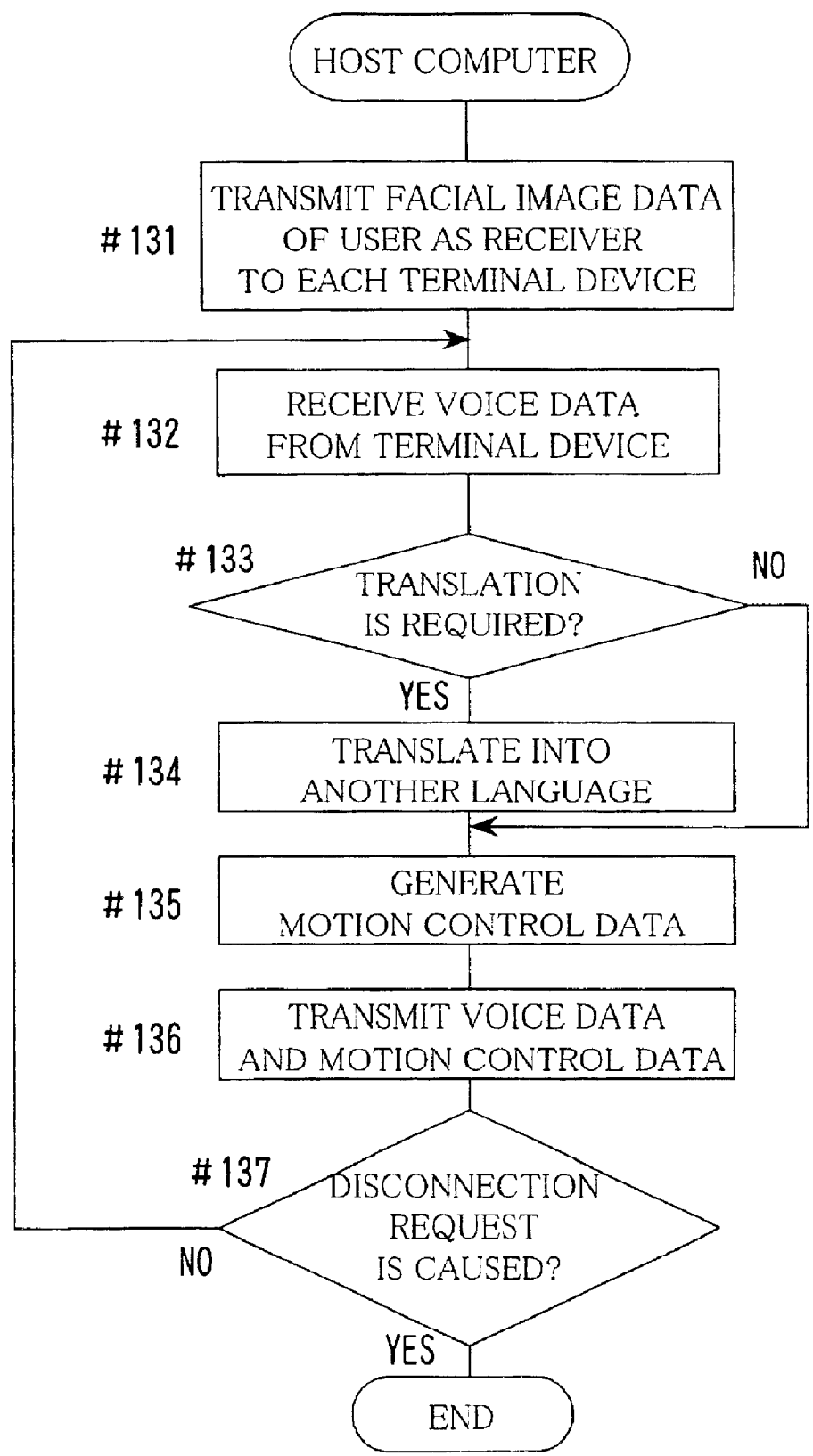
FIG. 19 is a flowchart showing a process of the host computer.

FIG. 17 is a flowchart showing a process of the communication system 1D of the fourth embodiment. FIG. 18 is a flowchart showing a process of the terminal devices 5D and 6D. FIG. 19 is a flowchart indicating a process of the host computer 3D.

First, communication between the terminal devices 5D and 6D is established (#110). In order to establish the communication, for example, a request for connection with the terminal device 6D is sent from the terminal device 5D to the host computer 3D. The host computer 3D notifies the terminal device 6D that a connection request is sent from the terminal device 5D. In the case where the connection is permitted, the terminal device 6D performs notification indicating the permission. Various known protocols can also be used for the communication.

After establishment of the communication, the host computer 3D transmits partner's facial image data FGD to the terminal devices 5D and 6D as shown in FIG. 17 (#111). Specifically, facial image data FGD selected by the user of the terminal device 6D are sent to the terminal device 5D, and facial image data FGD selected by the user of the terminal device 5D are transmitted to the terminal device 6D. Each of the users selects facial image data FGD according to the user's preference from the facial image database FDB or a database wherein facial image data FGD for each user are previously registered. In the selection, a list of selectable facial image data FGD may be displayed on a display of the each user, or the user may designate facial image data FGD the user like by specifying number or the like. Alternatively, one facial image data FGD previously designated by the each user may be transmitted.

The users start a conversation (#112). When the conversation is performed, the voice data SND are transmitted from one terminal device to the other terminal device.

At this point, each of the users can designate a language to be used for speaking and listening with respect to the host computer 3D. If a conversation in English is desired, English is designated as a language to be used for speaking as well as listening. It is also possible to so designate languages that the user can speak in Japanese and listen in English. The user can change the designated language to other languages in the middle of the conversation.

The host computer 3D judges whether translation is required in the conversation in accordance with designation of languages sent from the terminal devices 5D and 6D (#113). When a language used by one user for speaking is different from a language used by the other user for listening, the host computer 3D judges that translation is required. In the case where there is no designation of languages, the host computer 3D judges that a specific language, for example, Japanese is used in the conversation.

In the case where translation is required, the host computer 3D translates by means of the language translation engine EM3 (#114). The voice data SND2 are generated from the voice data SND1 by the translation.

The motion control data DSD are generated based on the voice data SND (#115). In the case where the translation is performed, the motion control data DSD are generated based on the translated voice data SND2.

In order to generate the motion control data DSD, for example, information such as phoneme is extracted from the voice data SND for designating words or emotions so that the motion control data DSD are generated by calculating motion of each control point PNT in the facial image data FGD.

The user may operate the keyboard 23b or the like of the terminal device so as to directly designate the user's emotions, instead of the designation by extracting the emotions from the received voice data SND. In this case, the terminal devices 5D and 6D transmit control data indicating emotions such as 'smile', 'anger' and the like. Thus, even if the user is tired, it is possible to display animation wherein the user seems to be cheerful on the screen of the receiver.

The voice data SND and the motion control data DSD are sent from the host computer 3D to the terminal device (#116).

In the terminal device, the received voice data SND are output from the speaker 22b, and the facial image data FGD that are received first are caused to move based on the received motion control data DSD, thereby producing animation and displaying the animation on the display 22a (#117).

When the user of the terminal device 5D says 'Good morning', the host computer 3D generates motion control data DSD for giving motion of 'Good morning' to a mouth of the facial image data FGD, and the generated motion control data DSD are transmitted to the terminal device 6D. In the terminal device 6D, a voice of 'Good morning' that is given by the user of the terminal device 5D is output from the speaker 22b. The display 22a displays the facial image data FGD of the user in the terminal device 5D and the mouth thereof opens and closes in connection with a voice of 'Good morning'.

Additionally, the host computer 3D analyzes emotions of the user in the terminal device 5D based on a tone of 'Good morning'. For example, in the case where the host computer 3D analyzes that the user in the terminal device 5D has a congenial atmosphere, the host computer 3D generates motion control data DSD for moving eyes and a whole face of the facial image data FGD to cause the eyes and the whole face of the facial image data FGD to smile and then transmits the generated motion control data DSD to the terminal device 6D. Thus, the display 22a in the terminal device 6D displays animation wherein the user in the terminal device 5D says 'Good morning' with smiling.

As described above, respective users can listen to the partners' voices and watch animation wherein expressions change based on the partners' talks.

The above-described processes are repeated and the users perform a conversation with watching animations until any one of the users requests disconnection of the communication (#118).

As shown in FIG. 18, each of the terminal devices 5D and 6D receives the facial image data FGD of a user as a receiver from the host computer 3D (#121). If each of the user starts to talk (Yes in #122), the terminal devices 5D and 6D transmit the voice data SND to the host computer 3D (#123). In the case of receiving the motion control data DSD and the voice data SND (Yes in #124), voice generated thereby is output and animation is displayed (#125).

As shown in FIG. 19, the host computer 3D sends the facial image data FGD of the user as the receiver to the respective terminal devices 5D and 6D (#131). In the case where the voice data SND are received from the terminal devices 5d and 6D (#132), the host computer 3D carries out translation if required (#133 and #134) and generates the motion control data DSD are generated (#135) followed by transmitting the motion control data DSD and the voice data SND to the respective user's terminal devices (#136).

Further, communication can be performed among three or more terminal devices. In this case, facial image data FGD of all other users are transmitted to respective users. Voice of each of the users is transmitted to the terminal devices of the all other users along with motion control data DSD based on the voice. In each of the terminal devices, only animation corresponding to the talking user may be selected from animation based on the received plural facial image data FGD to be displayed. Alternatively, animation of the all users may be simultaneously displayed or may be switched to be displayed one by one.

According to a communication system 1D of the fourth embodiment, facial image data FGD having a large amount of data are transmitted only once, and only motion control data DSD are sent afterward. Therefore, reduction in communications traffic is realized and it is possible to perform a conversation with watching partner's animation in which a motion appears smooth and substantially natural.

Since the facial image data FGD are represented by a structured three-dimensional model and three-dimensional animation is displayed on a screen, the display of realistic image close to original image is achieved.

The provision of an animation engine EG2 in a host computer 3D enables reduction in load of the processes performed by terminal devices 5D and 6D.

In addition, it is possible to perform a conversation free from discomfort even in a conversation with a receiver using a different language by providing translation service performed by the host computer 3D.

Since the motion control data DSD are generated based on the translated voice data SND, translated voice can be satisfactorily coincided with animation.

For example, motion of a mouth and a face differs by languages. In the case of display of real facial image, motion of a face is not retouched although voice is translated. According to the present embodiment, however, motion of a mouth and a face can be matched with the translated voice. Therefore, it is possible to display natural animation wherein expressions are precisely reproduced along with the translated voice on a screen of a receiver.

It is also possible to eliminate unnaturalness typically found in dubbed foreign movies, that is caused by discordance of motion of images and voices of different languages or by difference in lengths of voices.

In the fourth embodiment, original voice data SND1 may be transmitted along with translated voice data SND2. Thereby, multiplexing of voice can be realized so that a user can listen to the translated voice with confirming the original voice.

Text data of the translated voice data SND2 may be sent along with the translated voice data SND2 so that translated sentences can be displayed along with animation in the terminal devices 5D and 6D.

In the case where translation is unnecessary, a language translating program 3py and a language translation engine EM3 in the host computer 3D may be deleted.

Fifth Embodiment

Figure 20:
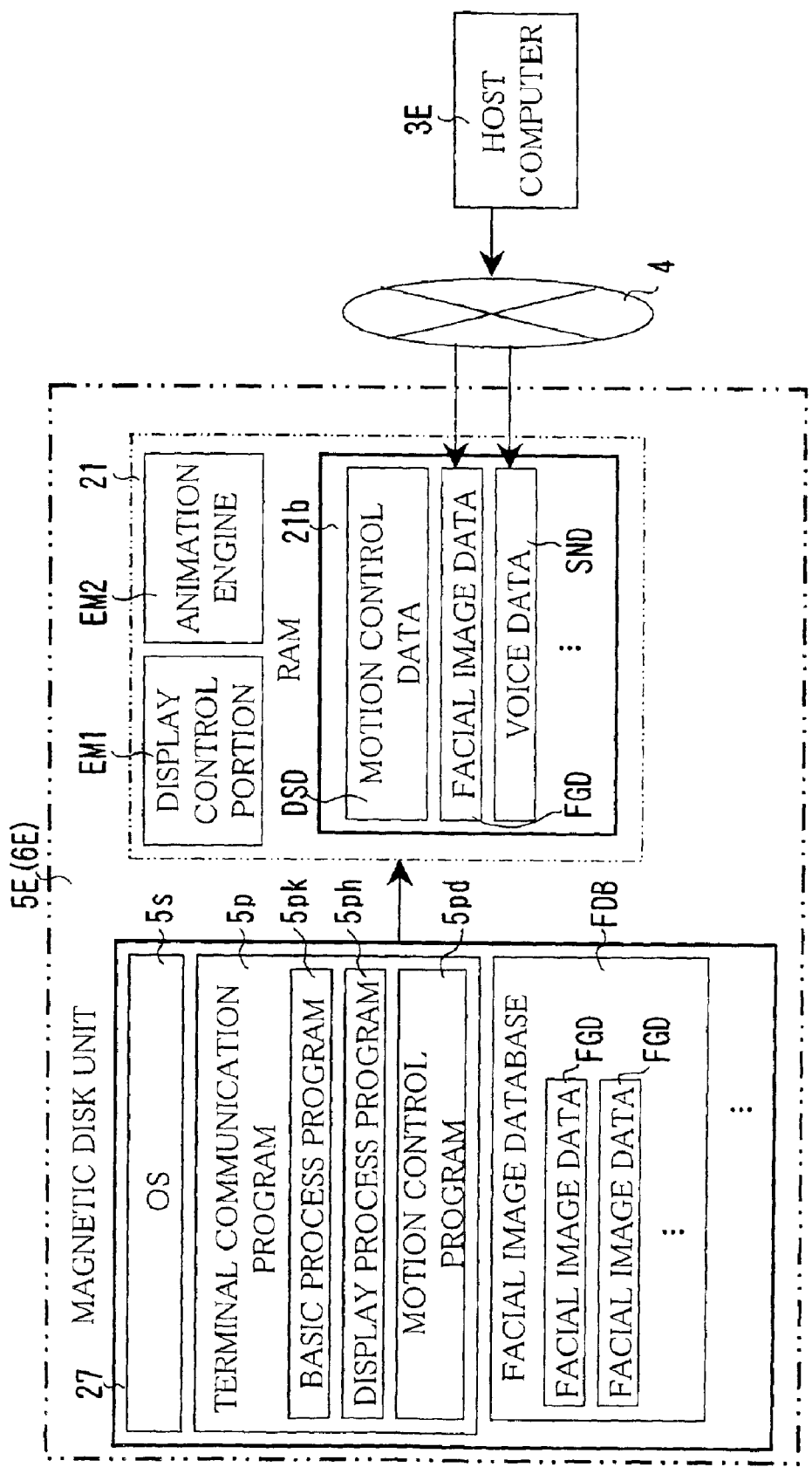
FIG. 20 shows an example of a program and data stored in a terminal device of a fifth embodiment.
Figure 21:
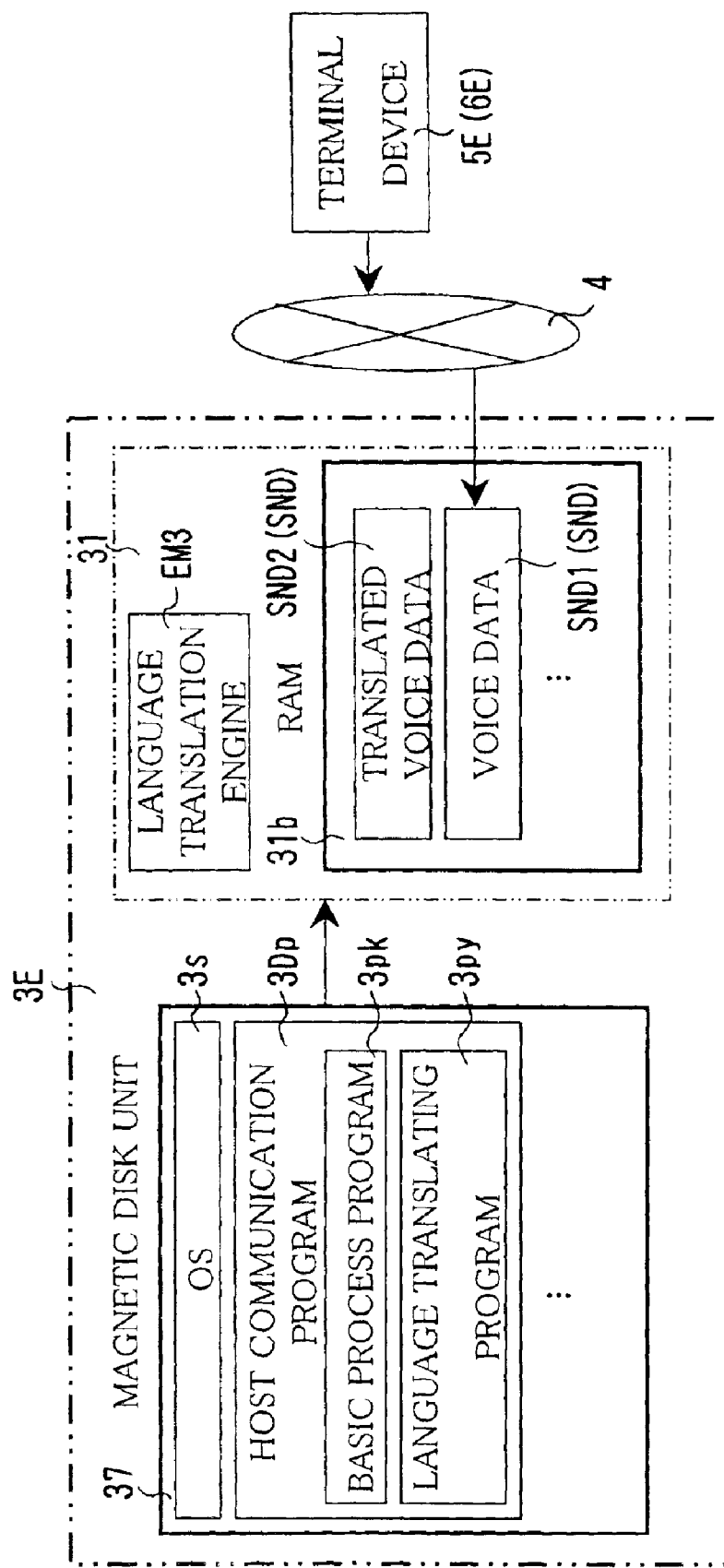
FIG. 21 shows an example of a program and data stored in a host computer.

FIG. 20 shows an example of a program and data stored in each of terminal devices 5E and 6E of a fifth embodiment. FIG. 21 shows an example of a program and data stored in a host computer 3E according to the fifth embodiment.

A whole structure of a communication system of the fifth embodiment is the same as in the fourth embodiment. Differences between the fourth embodiment and the fifth embodiment are programs and data stored in the terminal devices 5E and 6E as well as the host computer 3E and contents processed by processors 21 and 31.

Specifically, in the fourth embodiment, the facial image database FDB, the motion control program 3*pd* and the animation engine EM2 are provided in the host computer 3D. In the fifth embodiment, however, a facial image database FDB, a motion control program 5*pd* and an animation engine EM2 are provided in each of the terminal devices 5E and 6E, as shown in FIG. 20. Therefore, the facial image database FDB, the motion control program 5*pd* and the animation engine EM2 are not provided in the host computer 3E, as shown in FIG. 21.

Figure 22:
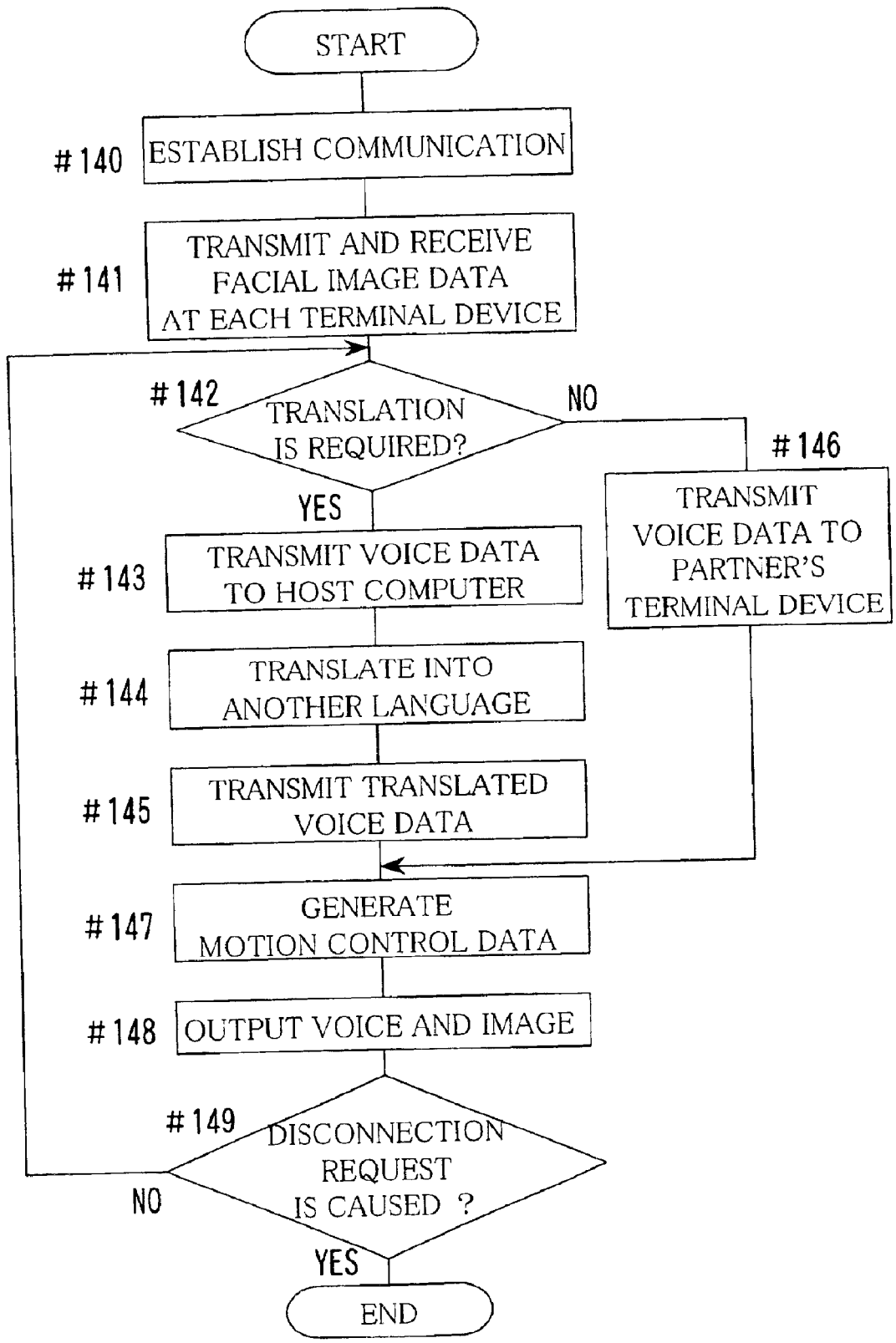
FIG. 22 is a flowchart showing a process of a communication system.

FIG. 22 is a flowchart showing a process of a communication system 1E according to the fifth embodiment. FIG. 23 is a flowchart showing a process of each of the terminal devices 5E and 6E. FIG. 24 is a flowchart showing a process of the host computer 3E.

As shown in FIG. 22, communication is established between the terminal devices 5E and 6E, first (#140). Facial image data FGD of respective users of the terminal devices 5E and 6E are exchanged (#141).

In order to start a conversation, a judgment is made as to whether translation is required (#142). The judgment is performed by the host computer 3D in the fourth embodiment, while the judgment is made by the terminal devices 5E and 6E in the fifth embodiment. For example, in the step #141, each of the users of the terminal devices 5E and 6E sends information of language he/she uses to the other user together with the facial image data FGD. Each of the terminal devices of the users as receivers judges whether translation is required or not based on the received information.

If it is judged that translation is required after starting a conversation, voice data SND are sent to the host computer 3E (#143). The host computer 3E translates the received voice data SND (#144) and transmits the translated voice data SND to both of the users' terminal devices (#145). If translation is not required, the voice data SND are transmitted to the users' terminal devices (#146).

Each of the terminal devices generates motion control data DSD based on the received voice data SND (#147). Then, each of the terminal devices outputs the received voice to cause the facial image data FGD to move based on the generated motion control data DSD, thereby displaying generated animation (#148).

As shown in FIG. 23, each of the users of the terminal devices 5E and 6E can receive the facial image data FGD (#151) of the user at the other end (a partner) and transmits his/her facial image data FGD to the partner (#152).

At this time, the received facial image data FGD may be saved in the facial image database FDB in order to be used at conversing with the same partner again.

In the case where translation is required (Yes in #153), the voice data SND are sent to the host computer 3E (#154). If translation is not required, the voice data SND are transmitted to the partner's terminal device (#155).

When one of the terminal devices receives the voice data SND sent from the other terminal device or the host computer 3E (Yes in #156), the terminal device generates the motion control data DSD (#157) and output the voice based on the data so that animation is displayed (#158).

As shown in FIG. 24, when the host computer 3E receives the voice data SND sent from one of the terminal devices (#161), the host computer 3E performs translation (#162) so that the translated voice data SND2 are transmitted to the partner's terminal device (#163).

According to the fifth embodiment, transmission and reception of the motion control data DSD is not required since motion control data DSD are generated not in a host computer 3E but in terminal devices 5E and 6E. Thus, communications traffic can be further reduced.

In the fifth embodiment, when translation is not required, voice data SND may be constantly transmitted to a partner's terminal device without making a decision shown in the step #153. In this case, the transmission may be carried out without using the host computer 3E. Accordingly, a communication system can be constructed by using a simple network not by using the host computer 3E.

In the fourth and fifth embodiments described above, facial image data FGD are previously obtained in the each terminal device in order to start a conversation, and animation is generated based on the motion control data DSD during the conversation. Thus, communications traffic can be reduced and animation expressing a natural motion can be displayed. Further, even if users uses different languages, it is possible to perform a conversation with watching each partner's animation wherein a motion is smooth and substantially natural.

As described above, multimedia of animation, voice and character data can be structured by outputting text data corresponding to voice data SND to the users.

It is possible to modify structure, circuit, process contents, processing order and order of communication of each part or whole part of a terminal device, a host computer or communication systems 1D and 1E can be modified without departing from the spirit and scope of the invention.

What is claimed is:

1. A communication system for performing a conversation with an actual or fictional human, animal, doll, character or the like virtualized by using a computer, comprising:

a client and a server, wherein the client includes:
   an input portion for inputting a first message addressed from a user to the human or the like;
   a transmitting portion for transmitting the first message;
   a receiving portion for receiving a second message and facial animation of the human or the like, the second message being addressed from the human or the like to the user as a response to the first message;
   an output portion for outputting the second message to the user; and
a display portion for displaying the facial animation, and the server includes:
   a storing portion for storing facial image data of the human or the like;
   a receiving portion for receiving the first message;
   a first generating portion for generating the second message in response to the reception of the first message;
   a second generating portion for generating motion control data for causing the facial image data to move in accordance with the second message;
   a third generating portion for generating the facial animation based on the motion control data and the facial image data; and
   a transmitting portion for transmitting the second message and the facial animation, wherein
the first message inputted from the user is a voice message of the user;
the second message generated in the server is a message that is established as the conversation in response to the first message inputted from the user; and
the motion control data are data used for causing the facial image data to move in synchronization with a timing when a voice is outputted at the time of pronunciation of the message.

2. The communication system according to claim 1, wherein the server is provided with a storing portion for storing person information as information concerning the human or the like, and the first generating portion generates the second message with reference to the person information concerning the human or the like.

3. The communication system according to claim 2, wherein the server is provided with a storing portion for storing sentence information as information for generating a conversation sentence, and the first generating portion extracts such sentence information that are likely to be used for a response from the human or the like to the first message and generates the second message.

4. The communication system according to claim 1, wherein the facial image data are data represented by a three-dimensional model so structured as to move, and the third generating portion causes a structured part of the three-dimensional model to move based on the motion control data.

5. A communication system for performing a conversation with an actual or fictional human, animal, doll, character or the like virtualized by using a computer, comprising:
   a client and a server;
   the client includes:
      an input portion for inputting a first message addressed from a user to the human or the like;
      a transmitting portion for transmitting the first message;
      an output portion for outputting a second message to the user, the second message being addressed from the human or the like to the user as a response to the first message;
      a receiving portion for receiving the second message, facial image data indicating a face of the human or the like by using image data and motion control data for causing the facial image data to move in accordance with the second message;
      a generating portion for generating facial animation of the human or the like based on the motion control data and the facial image data; and
      a display portion for displaying the facial animation, and the server includes:
      a storing portion for storing the facial image data;
      a receiving portion for receiving the first message;
      a first generating portion for generating the second message in response to the reception of the first message;
      a second generating portion for generating the motion control data; and
      a transmitting portion for transmitting the second message and the motion control data, wherein
   the first message inputted from the user is a voice message of the user;
   the second message generated in the server is a message that is established as the conversation in response to the first message inputted from the user; and
   the motion control data are data used for causing the facial image data to move in synchronization with a timing when a voice is outputted at the time of pronunciation of the message.

6. The communication system according to claim 5, wherein the server is provided with a storing portion for storing person information as information concerning the human or the like, and the first generating portion generates the second message with reference to the person information concerning the human or the like.

7. The communication system according to claim 6, wherein the server is provided with a storing portion for storing sentence information as information for generating a conversation sentence, and the first generating portion extracts such sentence information that are likely to be used for a response from the human or the like to the first message and generates the second message.

8. The communication system for performing a conversation with an actual or fictional human, animal, doll, character or the like virtualized by using a computer, comprising:
   a client and a server; wherein
   the client includes:
      a storing portion for storing facial image data of the human or the like;
      an input portion for inputting a first message addressed from a user to the human or the like;
      a transmitting portion for transmitting the first message;
      an output portion for outputting a second message to the user, the second message being addressed from the human or the like to the user as a response to the first message;
      a receiving portion for receiving the second message, the facial image data and motion control data for causing the facial image data to move in accordance with the second message;
      a generating portion for generating facial animation of the human or the like based on the motion control data and the facial image data; and
      a display portion for displaying the facial animation, and the server includes:
      a receiving portion for receiving the first message;
      a first generating portion for generating the second message in response to the reception of the first message; a second generating portion for generating the motion control data; and
      a transmitting portion for transmitting the second message and the motion control data, wherein
   the first message inputted from the user is a voice message of the user;
   the second message generated in the server is a message that is established as the conversation in response to the first message inputted from the user; and
   the motion control data are data used for causing the facial image data to move in synchronization with a timing when a voice is outputted at the time of pronunciation of the message.

9. The communication system according to claim 8, wherein the server is provided with a storing portion for storing person information as information concerning the human or the like, and the first generating portion generates the second message with reference to the person information concerning the human or the like.

10. The communication system according to claim 9, wherein the server is provided with a storing portion for storing sentence information as information for generating a conversation sentence, and the first generating portion extracts such sentence information that are likely to be used for a response from the human or the like to the first message and generates the second message.

11. A server used for a communication system for performing a conversation with an actual or fictional human, animal, doll, character or the like virtualized by using a computer, the server comprising:
   a storing portion for storing facial image data of the human or the like;
   a receiving portion for receiving a first message addressed from a user to the human or the like;

a first generating portion for generating a second message, the second message being addressed from the human or the like to the user as a response to the first message;

a second generating portion for generating motion control data for causing the facial image data to move in accordance with output of the second message;

a third generating portion for generating facial animation based on the motion control data and the facial image data; and a transmitting portion for transmitting the second message and the facial animation, wherein the first message received from the user is a voice message of the user;

the second message generated by the first generating portion is a message that is established as the conversation in response to the first message inputted from the user; and the motion control data are data used for causing the facial image data to move in synchronization with a timing when a voice is outputted at the time of pronunciation of the message.

12. The server according to claim 11, wherein the facial image data are data represented by a three-dimensional model so structured as to move, and the third generating portion causes a structured part of the three-dimensional model to move based on the motion control data.

13. A server used for a communication system for performing a conversation with an actual or fictional human, animal, doll, character or the like virtualized by using a computer, the server comprising:

a storing portion for storing facial image data of the human or the like;

a receiving portion for receiving a first message addressed from a user to the human or the like;

a first generating portion for generating a second message, the second message being addressed from the human or the like to the user as a response to the first message;

a second generating portion for generating motion control data for causing the facial image data to move in accordance with output of the second message; and a transmitting portion for transmitting the second message and the motion control data, wherein the first message received from the user is a voice message of the user;

the second message generated by the first generating portion is a message that is established as the conversation in response to the first message inputted from the user; and the motion control data are data used for causing the facial image data to move in synchronization with a timing when a voice is outputted at the time of pronunciation of the message.

14. A server used for a communication system for performing a conversation with an actual or fictional human or like virtualized by using a computer, the server comprising:

a receiving portion for receiving a first message addressed from a user to the human or the like;

a first generating portion for generating a second message, the second message being addressed from the human or the like to the user as a response to the first message;

a second generating portion for generating motion control data for moving facial image data of the human or the like in accordance with output of the second message; and a transmitting portion for transmitting the second message and the motion control data, wherein the first message received from the user is a voice message of the user;

the second message generated by the first generating portion is a message that is established as the conversation in response to the first message inputted from the user; and the motion control data are data used for causing the facial image data to move in synchronization with a timing when a voice is outputted at the time of pronunciation of the message.

15. A client used for a communication system for performing a conversation with an actual or fictional human, animal, doll, character or the like virtualized by using a computer, the client comprising:

an input portion for inputting a first message addressed from a user to the human or the like;

a transmitting portion for transmitting the first message;

an output portion for outputting a second message, the second message being addressed from the human or the like to the user as a response to the first message;

a receiving portion for receiving the second message, facial image data indicating a face of the human by using image data and motion control data for causing the facial image data to move in accordance with the second message;

a generating portion for generating facial animation of the human or the like based on the motion control data and the facial image data; and a display portion for displaying the facial animation, wherein the first message input from the user is a voice message of the user;

the second message output by the output portion is a message that is established as the conversation in response to the first message inputted from the user; and the motion control data are data used for causing the facial image data to move in synchronization with a timing when the voice is outputted at the time of pronunciation of the first message.

16. The client according to claim 15, wherein the facial image data are data represented by a three-dimensional model so structured as to move, and the generating portion causes a structured part of the three-dimensional model to move based on the motion control data.

17. A communication system for performing a conversation with watching a partner's animation comprising:

a host computer and a plurality of terminal devices, wherein each of the terminal devices includes:
a transmission and reception portion for transmitting and receiving a voice in a natural language;
a first receiving portion for receiving image data, a second receiving portion for receiving motion control data used for moving the image data; and
a display portion for displaying animation generated by moving the image data based on the motion control data, and the host computer includes:
a receiving portion for receiving a voice;
a translation portion for translating the received voice into another natural language;

a first transmitting portion for transmitting the translated voice;

a generating portion for generating the motion control data based on the translated voice; and a second transmitting portion for transmitting the image data and the motion control data of one of the terminal devices in communication to another one of the terminal devices in the communication, wherein the motion control data are data used for causing facial image data to move in synchronization with a timing when a voice is outputted at the time of pronunciation of a message using the translated other natural language, and said each of the terminal devices further includes a portion for a user to designate the natural language of the transmitted and received voice and the translated other natural language.

18. The communication system according to claim 17, wherein the facial image data are data represented by a three-dimensional model so structured as to move, and a structured part thereof are caused to move based on the motion control data in displaying the animation.

19. A host computer used for a communication system for performing a conversation with watching partner's animation, the host computer comprising:

a transmission and reception portion for transmitting and receiving a voice in a natural language;

a translation portion for translating the received voice into another natural language;

a first transmitting portion for transmitting the translated voice;

a generating portion for generating motion control data used for making facial image data move based on the translated voice; and a second transmitting portion for transmitting the image data and the motion control data of one of the terminal devices in communication to another one of the terminal devices in the communication, wherein the motion control data are data used for causing the facial image data to move in synchronization with a timing when a voice is outputted at the time of pronunciation of a message using the translated other natural language, and a user designates, via a portion external to the host computer, the natural language of the voice transmitted and received and the translated other natural language.

20. A communication system for performing a conversation with watching partner's animation, comprising:

a host computer and a plurality of terminal devices, wherein each of the terminal devices includes:

a first transmission and reception portion for transmitting and receiving a voice in a natural language;

a storing portion for storing image data;

a second transmission and reception portion for transmitting and receiving the image data;

a generating portion for generating motion control data for causing the received the received voice; and image data to move based on a display portion for displaying animation generated by moving the received image data based on the motion control data, and the host computer includes:

a receiving portion for receiving a voice;

a translation portion for translating the received voice into another natural language; and a transmitting portion for transmitting the translated voice in the other natural language, wherein the motion control data are data used for causing facial image data to move in synchronization with a timing when a voice is outputted at the time of pronunciation of a message using the translated other natural language, and said each of the terminal devices further includes a portion for a user to designate the natural language of the transmitted and received voice and the translated other natural language.

21. A communication method comprising the steps of:

preparing animation in a first terminal device connected to a network;

transmitting a voice signal of a sentence comprised in a natural language from a second terminal device to a host computer via the network;

receiving the sentence of the transmitted voice signal in the host computer so as to translate the sentence into a sentence comprising another natural language;

generating a voice signal corresponding to the translated sentence;

generating a motion control signal of animation corresponding to the voice signal of the translated sentence;

transmitting the generated voice signal and the generated motion control signal from the host computer to the first terminal device via the network; and receiving the transmitted voice signal and the transmitted motion control signal in the first terminal device so as to output a voice corresponding to the voice signal for moving the animation in accordance with the motion control signal, wherein the motion control data are data used for causing facial image data to move in synchronization with a timing when the voice corresponding to the voice signal for moving the animation is outputted at the time of pronunciation of the translated sentence using the other natural language, and a user at the second terminal device designates the natural language of the transmitted voice signal of the sentence and a user at the first terminal device designates the other natural language the host computer translates the sentence of the transmitted voice into.

22. The communication method according to claim 21, wherein the animation indicates a face of a human.

23. The communication method according to claim 22, wherein the motion control signal is a signal for controlling a motion of a mouth of the animation corresponding to the translated sentence.

24. The communication method according to claim 21, wherein the animation moves in accordance with the output of the voice.

25. A communication method comprising the steps of:

receiving a voice signal of a sentence comprised in a natural language from a terminal device;

translating the sentence of the received voice signal into a sentence comprising another natural language;

generating a voice signal corresponding to the translated sentence;

generating a motion control signal of animation corresponding to the generated voice signal; and transmitting the generated voice signal and the generated motion control signal to another terminal device, wherein the motion control signal of animation is used for causing facial image data to move in synchronization with a timing when the generated voice signal is outputted at the time of pronunciation of the translated sentence using the other natural language, and a user at the terminal device designates the natural language of the sentence and the other natural language the sentence is translated into.

26. A communication method comprising the steps of:

designating at a terminal device both a natural language and another natural language;

receiving a voice signal of a sentence comprised in the natural language from the terminal device;

translating the sentence of the received voice signal into a sentence comprising the other natural language;

generating a voice signal corresponding to the translated sentence; and transmitting the generated voice signal to another terminal device.

* * * * *